(12) United States Patent
Naruse et al.

(10) Patent No.: US 10,931,888 B2
(45) Date of Patent: Feb. 23, 2021

(54) IMAGE PROCESSING DEVICE, IMAGE PROCESSING METHOD, AND CAMERA SYSTEM

(71) Applicant: FUJIFILM Corporation, Tokyo (JP)

(72) Inventors: Yosuke Naruse, Saitama (JP); Yasunobu Kishine, Saitama (JP); Kenkichi Hayashi, Saitama (JP); Yoshiaki Ishii, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/518,095

(22) Filed: Jul. 22, 2019

(65) Prior Publication Data
US 2019/0340788 A1   Nov. 7, 2019

Related U.S. Application Data

(63) Continuation of application No. PCT/JP2017/043948, filed on Dec. 7, 2017.

(30) Foreign Application Priority Data

Feb. 17, 2017   (JP) .............................. JP2017-028061

(51) Int. Cl.
*H04N 5/247* (2006.01)
*G06T 7/80* (2017.01)
(Continued)

(52) U.S. Cl.
CPC .............. *H04N 5/247* (2013.01); *G06T 5/001* (2013.01); *G06T 7/80* (2017.01); *G06T 7/97* (2017.01); *H04N 5/23206* (2013.01)

(58) Field of Classification Search
CPC ...... H04N 5/2258; H04N 5/247; H04N 7/181; H04N 13/243; H04N 13/246; H04N 13/25;
(Continued)

(56) References Cited

U.S. PATENT DOCUMENTS

2008/0080019 A1   4/2008   Hayashi et al.
2010/0123807 A1*  5/2010   Lee ........................ G06T 5/50
                                                        348/241
(Continued)

FOREIGN PATENT DOCUMENTS

JP   2008-85697 A    4/2008
JP   2012-156716 A   8/2012
WO   WO 2011/122283 A1  10/2011

OTHER PUBLICATIONS

International Preliminary Report on Patentability arid Written Opinion of the International Searching Authority for International Application No. PCT/JP2017/043948, dated Aug. 29, 2019, with English translation.

(Continued)

*Primary Examiner* — Paul M Berardesca
(74) *Attorney, Agent, or Firm* — Birch, Stewart, Kolasch & Birch, LLP

(57) ABSTRACT

An image processing device includes a transfer function input unit to which each of transfer functions of a plurality of imaging-systems is input, a calculation unit that calculates a target resolution value which is a target value of recovery processing that recovers a plurality of captured images to be output from each of the plurality of the imaging-systems based on each of the input transfer functions and a predetermined criterion, a recovery filter generation unit that generates a recovery filter used for the recovery processing with respect to each of the plurality of imaging-systems based on each of the transfer functions of the plurality of imaging-systems and a target resolution value, and a recovered image generation unit that performs the recovery processing with respect to the captured images acquired from the plurality of imaging-systems by using the (Continued)

recovery filter generated for each of the plurality of imaging-systems to generate recovered images.

20 Claims, 12 Drawing Sheets

(51) Int. Cl.
*G06T 7/00* (2017.01)
*G06T 5/00* (2006.01)
*H04N 5/232* (2006.01)

(58) Field of Classification Search
CPC ........ H04N 13/286; G06T 2207/10021; G06T 5/001–003; G06T 2207/20182–20201
See application file for complete search history.

(56) References Cited

U.S. PATENT DOCUMENTS

| | | | |
|---|---|---|---|
| 2011/0292257 A1 | 12/2011 | Hatakeyama | |
| 2012/0189226 A1 | 7/2012 | Okada | |
| 2015/0279073 A1* | 10/2015 | Ikeda | G06T 5/003 382/190 |
| 2016/0117800 A1* | 4/2016 | Korkin | G06K 9/6215 348/239 |
| 2017/0221188 A1* | 8/2017 | Aoki | G01C 3/06 |

OTHER PUBLICATIONS

International Search Report for International Application No. PCT/JP2017/043948, dated Feb. 6, 2018, with English translation.

* cited by examiner

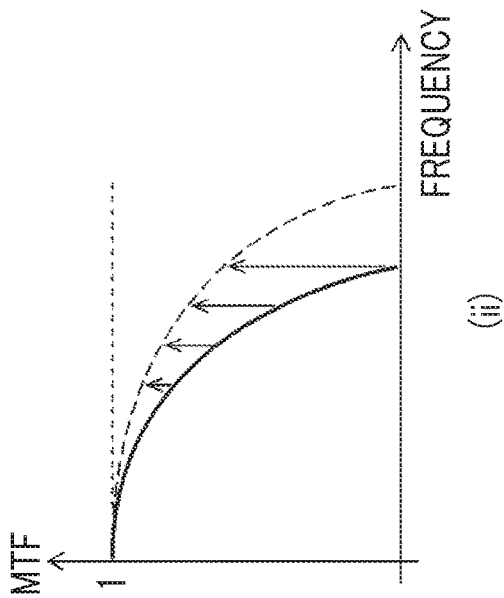
FIG. 5
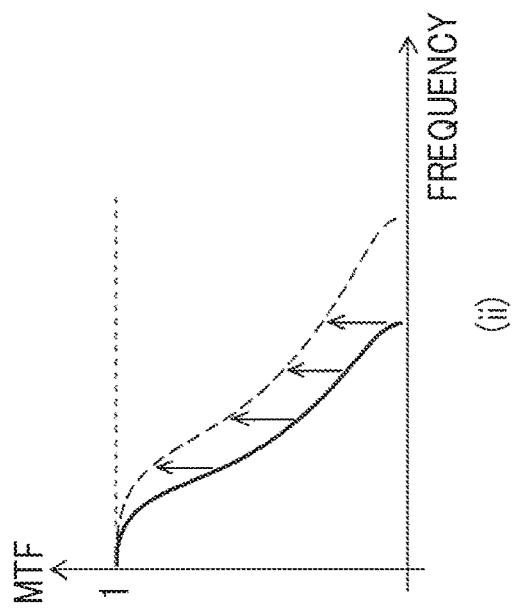
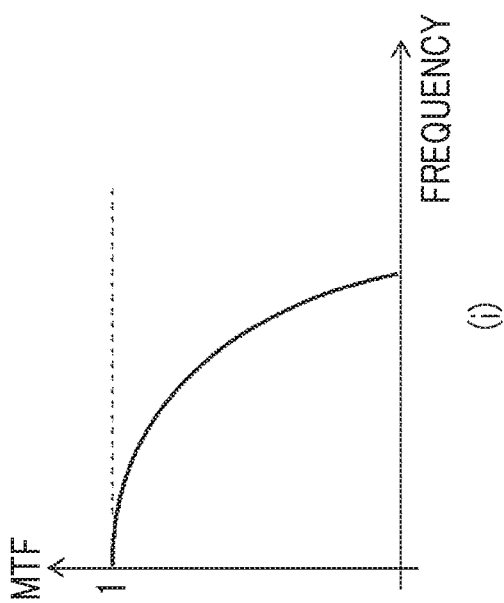
FIG. 6
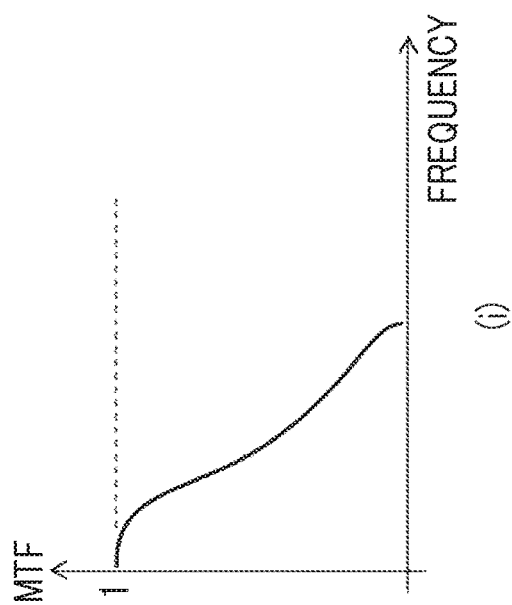

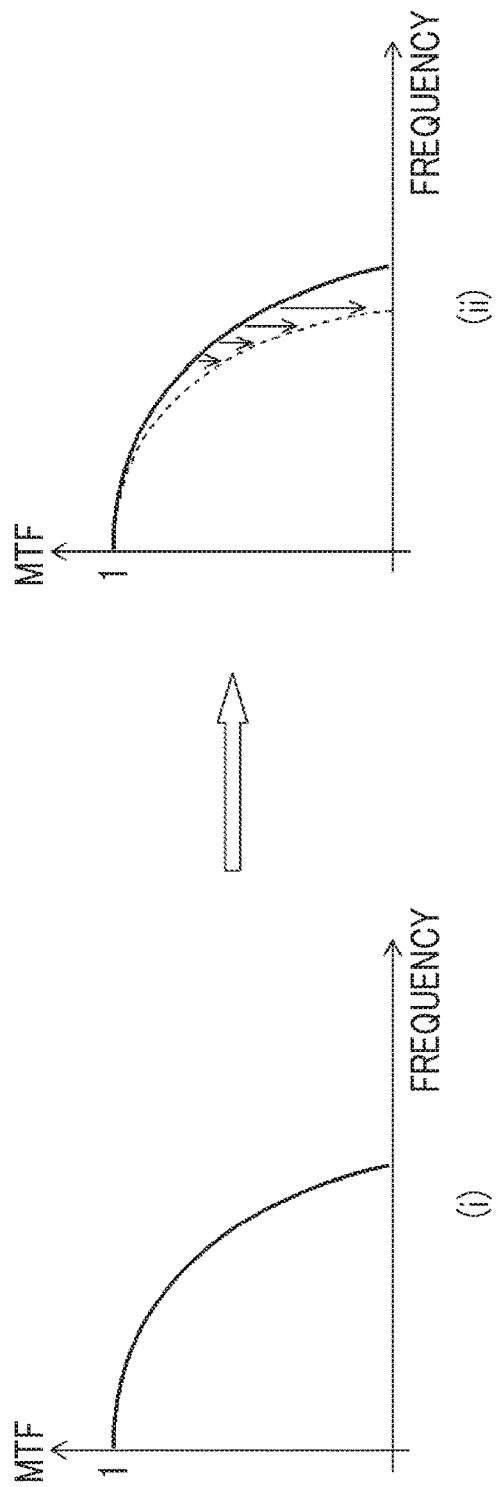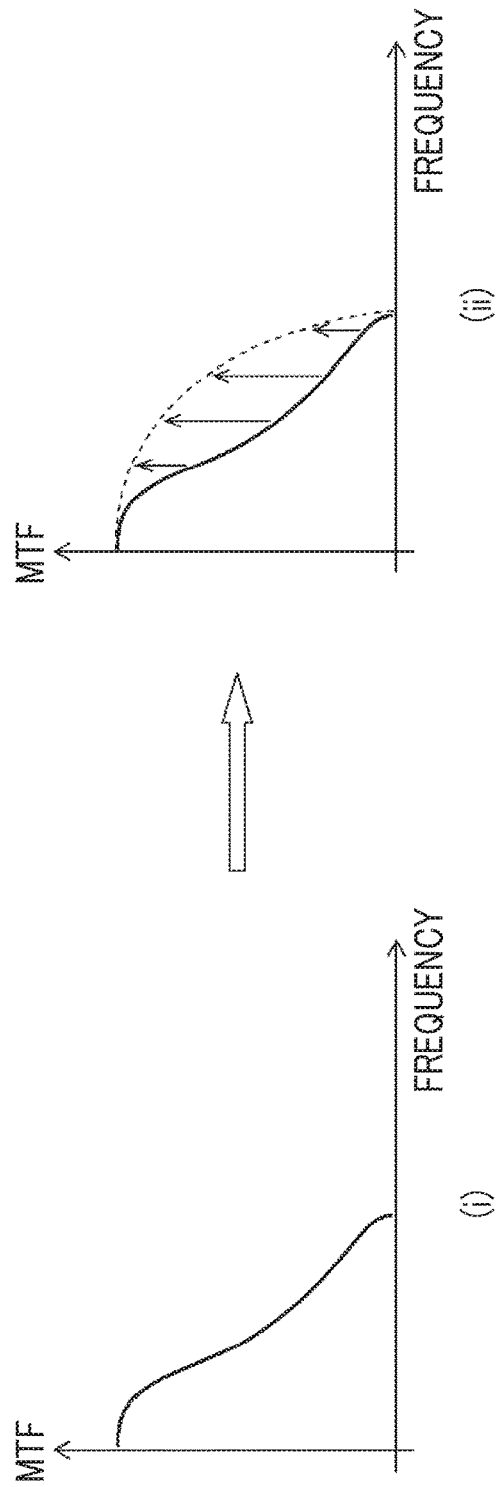

IMAGE PROCESSING DEVICE, IMAGE PROCESSING METHOD, AND CAMERA SYSTEM

CROSS-REFERENCE TO RELATED APPLICATIONS

This application is a Continuation of PCT International Application No. PCT/JP2017/043948 filed on Dec. 7, 2017, which claims priority under 35 U.S.C § 119(a) to Japanese Patent Application No. 2017-028061 filed on Feb. 17, 2017. Each of the above application(s) is hereby expressly incorporated by reference, in its entirety, into the present application.

BACKGROUND OF THE INVENTION

1. Field of the Invention

The invention relates to an image processing device, an image processing method, and a camera system in which recovery processing is performed based on a point spread function.

2. Description of the Related Art

For example, JP2008-085697A discloses an imaging device that performs restoration processing (recovery processing) by using a restoration filter (recovery filter).

SUMMARY OF THE INVENTION

An aspect according to the technology of the present disclosure provide an image processing device, an image processing method, and a camera system capable of obtaining images with the same resolution and good image quality even for images to be output from a plurality of imaging systems.

In order to achieve the object, an image processing device which is one aspect of the invention comprises a transfer function input unit to which each of transfer functions of a plurality of imaging systems is input, a calculation unit that calculates a target resolution value which is a target value of recovery processing that recovers a plurality of captured images to be output from each of the plurality of the imaging systems based on each of the input transfer functions and a predetermined criterion, a recovery filter generation unit that generates a recovery filter used for the recovery processing with respect to each of the plurality of imaging systems based on each of the transfer functions of the plurality of imaging systems and the target resolution value, and a recovered image generation unit that performs the recovery processing with respect to the captured images acquired from the plurality of imaging systems by using the recovery filter generated for each of the plurality of imaging systems to generate recovered images. The predetermined criterion used by the calculation unit minimizes an error between the recovered images in the entire plurality of imaging systems and ideal images before being deteriorated in the plurality of imaging systems, with a precondition of matching resolution values of the recovered images of the plurality of imaging systems.

According to this aspect, the calculation unit calculates the target resolution value in the plurality of imaging systems based on the criterion that minimizes the error between the recovered images in the entire plurality of imaging systems and the ideal images before being deteriorated in the imaging systems with the precondition of matching the resolution values of the recovered images of the plurality of imaging systems. The recovery filter generation unit generates the recovery filter to be used for the image output from each of the imaging systems based on the target resolution value calculated by the calculation unit, and the recovered image generation unit generates the recovered image obtained by performing the recovery processing with respect to the captured image.

An image processing device which is another aspect of the invention comprises a transfer function input unit to which each of transfer functions of a plurality of imaging systems is input, an imaging condition input unit to which each of imaging conditions of the plurality of imaging systems is input, a calculation unit that calculates a target resolution value which is a target value of recovery processing that recovers a plurality of captured images to be output from each of the plurality of the imaging systems based on each of the input transfer functions, each of the imaging conditions, and a predetermined criterion, a recovery filter generation unit that generates a recovery filter used for the recovery processing with respect to each of the plurality of imaging systems based on each of the transfer functions of the plurality of imaging systems and the target resolution value, and a recovered image generation unit that performs the recovery processing with respect to the captured images acquired from the plurality of imaging systems by using the recovery filter generated for each of the plurality of imaging systems to generate recovered images. The predetermined criterion used by the calculation unit minimizes a weighted error between the recovered images in the entire imaging conditions of the entire plurality of imaging systems and ideal images before being deteriorated in the plurality of imaging systems, with a precondition of minimizing a difference between resolution values of the recovered images of the plurality of imaging systems and the target resolution value while a weight according to the imaging condition is adapted.

According to this aspect, the calculation unit calculates the target resolution value of the plurality of imaging systems based on the criterion that minimizes the weighted error between the recovered images in the entire imaging conditions of the entire plurality of imaging systems and the ideal images before being deteriorated in the imaging systems, with the precondition of minimizing the difference between the resolution values of the recovered images of the plurality of imaging systems and the target resolution value while the weight according to the imaging condition is adapted. The recovery filter generation unit generates the recovery filter to be used for the image output from each of the imaging systems based on the target resolution value calculated by the calculation unit, and the recovered image generation unit generates the recovered image obtained by performing the recovery processing with respect to the captured image. Accordingly, in this aspect, it is possible to acquire the recovered images with the same resolution value and good image quality even for the captured images acquired from the plurality of imaging systems.

The image processing device preferably comprises a weight input unit to which the weight representing a degree of matching with the target resolution value according to each of the imaging conditions input to the imaging condition input unit is input.

According to this aspect, the weight representing the degree of matching with the target resolution value according to each of the imaging conditions input to the imaging condition input unit is input from the weight input unit.

The calculation unit preferably calculates the target resolution value based on a criterion that minimizes a total value of square errors between the recovered images and the ideal images.

According to this aspect, the calculation unit calculates the target resolution value based on the criterion that minimizes the total value of the square errors between the recovered images and the ideal images. Accordingly, in this aspect, it is possible to acquire the recovered images with good image quality.

A camera system which is another aspect of the invention comprises the image processing device described above. The plurality of imaging systems and a control device that controls the plurality of imaging systems are connected wiredly or wirelessly. The image processing device is provided in the control device.

According to this aspect, the control device in the camera system comprises the image processing device described above.

A camera system which is another aspect of the invention comprises the image processing device described above. The plurality of imaging systems and a control device that controls the plurality of imaging systems are connected wiredly or wirelessly. The image processing device is provided in at least one of the plurality of imaging systems.

According to this aspect, the image processing device described above is provided in at least one of the plurality of cameras constituting the camera system.

A camera system which is another aspect of the invention comprises a plurality of cameras having the image processing device described above. The plurality of imaging systems and a control device that controls the plurality of imaging systems are connected wiredly or wirelessly. The image processing device is provided in each of the plurality of imaging systems.

According to this aspect, each of the plurality of imaging systems constituting the camera system comprises the image processing device described above.

An image processing method which is another aspect of the invention comprises a transfer function input step in which each of transfer functions of a plurality of imaging systems is input, a calculation step of calculating a target resolution value which is a target value of recovery processing that recovers a plurality of captured images to be output from each of the plurality of the imaging systems based on each of the input transfer functions and a predetermined criterion, a recovery filter generation step of generating a recovery filter used for the recovery processing with respect to each of the plurality of imaging systems based on each of the transfer functions of the plurality of imaging systems and the target resolution value, and a recovered image generation step of performing the recovery processing with respect to the captured images acquired from the plurality of imaging systems by using the recovery filter generated for each of the plurality of imaging systems to generate recovered images. The predetermined criterion used in the calculation step minimizes an error between the recovered images in the entire plurality of imaging systems and ideal images before being deteriorated in the plurality of imaging systems, with a precondition of matching resolution values of the recovered images of the plurality of imaging systems.

An image processing method which is another aspect of the invention comprises a transfer function input step in which each of transfer functions of a plurality of imaging systems is input, an imaging condition input step in which each of the imaging conditions of the plurality of imaging systems is input, a calculation step of calculating a target resolution value which is a target value of recovery processing that recovers a plurality of captured images to be output from each of the plurality of the imaging systems based on each of the input transfer functions, each of the imaging conditions, and a predetermined criterion, a recovery filter generation step of generating a recovery filter used for the recovery processing with respect to each of the plurality of imaging systems based on each of the transfer functions of the plurality of imaging systems and the target resolution value, and a recovered image generation step of performing the recovery processing with respect to the captured images acquired from the plurality of imaging systems by using the recovery filter generated for each of the plurality of imaging systems to generate recovered images. The predetermined criterion used in the calculation step minimizes an error between the recovered images in the entire imaging conditions of the entire plurality of imaging systems and ideal images before being deteriorated in the plurality of imaging systems, with a precondition of minimizing a difference between resolution values of the recovered images of the plurality of imaging systems and the target resolution value while a weight according to the imaging condition is adapted.

A camera system which is another aspect of the invention, in which a plurality of imaging systems are connected wiredly or wirelessly, comprises a transfer function input step in which each of transfer functions of the plurality of imaging systems is input, a calculation step of calculating a target resolution value which is a target value of recovery processing that recovers a plurality of captured images to be output from each of the plurality of the imaging systems based on each of the input transfer functions and a predetermined criterion, and a recovery filter generation step of generating a recovery filter used for the recovery processing with respect to each of the plurality of imaging systems based on each of the transfer functions of the plurality of imaging systems and the target resolution value. The predetermined criterion used in the calculation step has the recovery filter generated by a recovery filter generation method that minimizes an error between recovered images in the entire plurality of imaging systems and ideal images before being deteriorated in the plurality of imaging systems, with a precondition of matching resolution values of the recovered images of the plurality of imaging systems.

A camera system which is another aspect of the invention, in which a plurality of imaging systems are connected wiredly or wirelessly, comprises a transfer function input step in which each of transfer functions of a plurality of imaging systems is input, and a calculation step of calculating a target resolution value which is a target value of recovery processing that recovers a plurality of captured images to be output from each of the plurality of the imaging systems based on each of the input transfer functions and a predetermined criterion. The predetermined criterion used in the calculation step has the target resolution value calculated by a target resolution value calculation method that minimizes an error between recovered images in the entire plurality of imaging systems and ideal images before being deteriorated in the plurality of imaging systems, with a precondition of matching resolution values of the recovered images of the plurality of imaging systems.

A camera system which is another aspect of the invention, in which a plurality of imaging systems are connected wiredly or wirelessly, comprises a transfer function input step in which each of transfer functions of a plurality of imaging systems is input, an imaging condition input step in which each of the imaging conditions of the plurality of imaging systems is input, a calculation step of calculating a target resolution value which is a target value of recovery processing that recovers a plurality of captured images to be output from each of the plurality of the imaging systems based on each of the input transfer functions, each of the imaging conditions, and a predetermined criterion, and a recovery filter generation step of generating a recovery filter used for the recovery processing with respect to each of the plurality of imaging systems based on each of the transfer functions of the plurality of imaging systems and the target resolution value. The predetermined criterion used in the calculation step has a recovery filter generated by a recovery filter generation method that minimizes an error between recovered images in the entire imaging conditions of the entire plurality of imaging systems and ideal images before being deteriorated in the plurality of imaging systems, with a precondition of minimizing a difference between resolution values of the recovered images of the plurality of imaging systems and the target resolution value while a weight according to the imaging condition is adapted.

A camera system which is another aspect of the invention, in which a plurality of imaging systems are connected wiredly or wirelessly, comprises a transfer function input step in which each of transfer functions of a plurality of imaging systems is input, an imaging condition input step in which each of the imaging conditions of the plurality of imaging systems is input, and a calculation step of calculating a target resolution value which is a target value of recovery processing that recovers a plurality of captured images to be output from each of the plurality of the imaging systems based on each of the input transfer functions, each of the imaging conditions, and a predetermined criterion. The predetermined criterion used in the calculation step has the target resolution value calculated by a target resolution value calculation method that minimizes an error between recovered images in the entire imaging conditions of the entire plurality of imaging systems and ideal images before being deteriorated in the plurality of imaging systems, with a precondition of minimizing a difference between resolution values of the recovered images of the plurality of imaging systems and the target resolution value while a weight according to the imaging condition is adapted.

BRIEF DESCRIPTION OF THE DRAWINGS

FIG. 5 is a diagram showing a relationship between an MTF of an image and a frequency.

FIG. 6 is a diagram showing a relationship between an MTF of an image and a frequency.

FIGS. 7A and 7B are diagrams showing a relationship between an MTF of an image and a frequency.

DESCRIPTION OF THE PREFERRED EMBODIMENTS

Hereinafter, preferable embodiments of an image processing device, an image processing method, and a camera system of embodiments of the invention will be described with reference to accompanying drawings.

First Embodiment

First, the first embodiment of the invention will be described.

Figure 1:
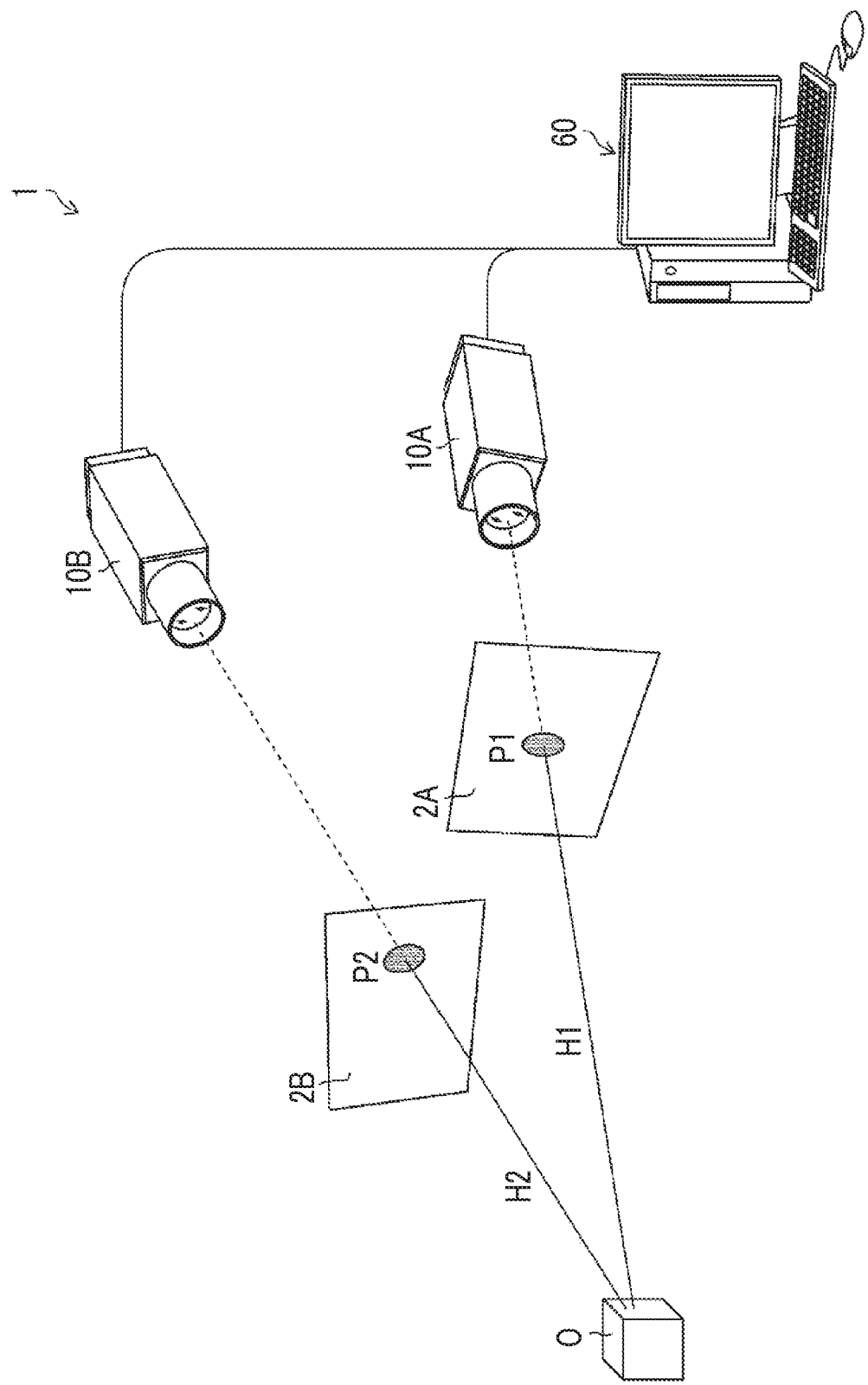
FIG. 1 is a diagram conceptually showing a camera system.

FIG. 1 is a diagram conceptually showing a camera system composed of a plurality of cameras and a control device.

A camera system 1 is composed of a camera (imaging system) 10A, a camera (imaging system) 10B, and a computer (control device) 60. The camera 10A acquires a captured image 2A, and the camera 10B acquires a captured image 2B. In the figure, the captured image 2A and the captured image 2B are conceptually shown with imaging directions of the cameras 10A and 10B.

The cameras 10A and 10B are respectively installed at different positions and image a subject O. The camera 10A has a transfer function H1, and an image of the subject O is projected at a position of P1 in the captured image 2A of the camera 10A. The camera 10B has a transfer function H2, and the image of the subject O is projected at a position of P2 in the captured image 2B of the camera 10B. In the camera system 1, the camera 10A, the camera 10B, and a computer 60 are wiredly connected, but may be wirelessly connected.

The camera system 1 is used, for example, in a FAMV application. The images captured by the cameras 10A and 10B are subjected to an image analysis to recognize a subject captured in the images. For this purpose, it is desired that the subject O is captured with the same resolution in the captured image 2A and 2B. The resolution is fineness of an image display, which refers to the ability to express details in an image, and can also be represented numerically as a resolution value or a resolution degree.

In the invention, recovery processing is performed by the image processing device provided in the camera system 1, such that the resolutions of the subject O on the images become the same. Specifically, the recovery processing is performed by obtaining the transfer functions H1 and H2 of the cameras 10A and 10B by calibration, such that the resolution values of the subject O at the positions (P1 and P2) of the subject O on the images become the same. Here, the calibration refers to, for example, place charts at the positions of the subject O to be targeted of the cameras 10A and 10B, and to measure each of the transfer functions. In the specification, "the resolutions are the same or match"

means, for example, that the resolutions are within an error range of 5%, preferably 3% based on a target resolution value.

Figure 2:
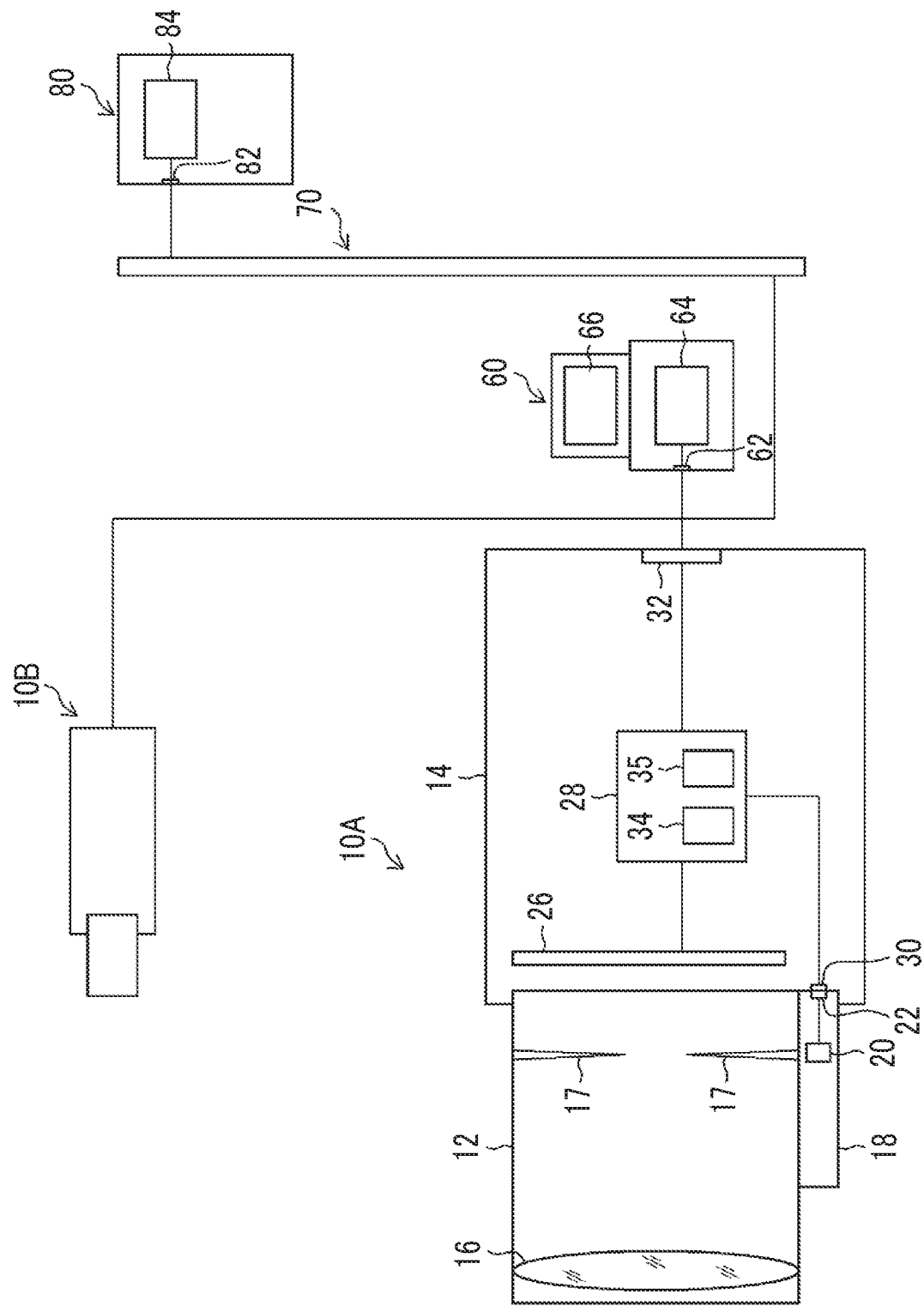
FIG. 2 is a block diagram showing functional configurations of a computer and a camera constituting the camera system.

FIG. 2 is a block diagram showing functional configurations of the computer 60, and the cameras 10A and 10B to be connected to the computer 60 constituting the camera system 1. Since the cameras 10A and 10B have the same configuration, only the configuration of the camera 10A will be described and the description of the configuration of the camera 10B is omitted.

The camera 10A comprises an interchangeable lens unit 12 and a camera body 14 including an imaging element 26, and the lens unit 12 and the camera body 14 are electrically connected through a lens unit input and output unit 22 of the lens unit 12 and a camera body input and output unit 30 of the camera body 14.

The lens unit 12 includes an optical system such as a lens 16 and a stop 17 or the like, and an optical system operation unit 18 that controls the optical system. The optical system operation unit 18 includes a lens unit controller 20 to be connected to the lens unit input and output unit 22 and an actuator (not shown) that operates the optical system. The lens unit controller 20 controls the optical system through the actuator based on a control signal transmitted from the camera body 14 through the lens unit input and output unit 22 to perform, for example, a focus control and a zoom control by moving a lens, a stop amount control of the stop 17, and the like.

The imaging element 26 of the camera body 14 has a condensing microlens, a color filter such as R (red), G (green), and B (blue), and an image sensor (photodiode; complementary metal oxide semiconductor (CMOS), charge-coupled device (CCD), or the like). The imaging element 26 converts light of a subject image irradiated through the optical system (lens 16, stop 17, and the like) of the lens unit 12 into an electric signal and transmits an image signal (original image data) to a camera body controller 28. A case where the camera 10A acquires a color image will be described, but the camera 10A can also acquire a black-and-white image or a monochrome image.

The imaging element 26 in the example outputs an original image data by imaging the subject image using the optical system, and the original image data is transmitted to an image processing unit 35 of the camera body controller 28.

The camera body controller 28 has a device control unit 34 and the image processing unit 35 as shown in FIG. 2 and integrally controls the camera body 14. The device control unit 34, for example, controls an output of the image signal (image data) from the imaging element 26 to generate the control signal for controlling the lens unit 12 and transmits the generated signal to the lens unit 12 (lens unit controller 20) through the camera body input and output unit 30, and transmits image data (RAW data, JPEG data, or the like) before and after image processing to external apparatuses (computer 60 or the like) to be connected through an input and output interface 32. The device control unit 34 controls various devices included in the camera 10A as appropriate.

The image processing unit 35 can perform predetermined image processing as necessary with respect to the image signal from the imaging element 26. For example, various pieces of image processing such as sensor correction processing, demosaicing (synchronization) processing, pixel interpolation processing, color correction processing (offset correction processing, white balance processing, color matrix processing, gradation correction processing, and the like), RGB image processing (sharpness processing, tone correction processing, exposure correction processing, contour correction processing, and the like), RGB and/or YCrCb correction processing, and image compression processing are performed by the image processing unit 35 as appropriate.

The image data subjected to the image processing in the camera body controller 28 is transmitted to the computer 60 and the like through the input and output interface 32. A format of the image data transmitted to the computer 60 and the like from the camera 10A (camera body controller 28) is not particularly limited and may be a predetermined format such as RAW, JPEG, TIFF, or the like. Therefore, the camera body controller 28 may associate a plurality of pieces of related data such as header information (imaging information (an imaging date and time, model type, the number of pixels, F number, and the like) and the like), main image data, and thumbnail image data with one another to constitute one image file like a so-called exchangeable image file format (Exif), and may transmit the image file to the computer 60.

The computer 60 is connected to the camera 10A through the input and output interface 32 of the camera body 14 and a computer input and output unit 62, and receives data such as the image data transmitted from the camera body 14. A computer controller 64 integrally controls the computer 60 to perform the image processing of the image data from the camera 10A and to control communication with a server 80 and the like to be connected to the computer input and output unit 62 through a network line such as the Internet 70. The computer 60 has a display 66, and processing contents in the computer controller 64 or the like are displayed on the display 66 as necessary. A user can input data or a command to the computer controller 64 by operating input means (not shown) such as a keyboard while checking the display of the display 66. Accordingly, the user can control the computer 60 and the apparatuses (camera 10A, camera 10B, and server 80) to be connected to the computer 60.

The server 80 has a server input and output unit 82 and a server controller 84. The server input and output unit 82 constitutes a transmission and reception connection unit with the external apparatuses such as the computer 60 and the like, and is connected to the computer input and output unit 62 of the computer 60 through the network line such as the Internet 70. The server controller 84 cooperates with the computer controller 64 in response to a control instruction signal from the computer 60 to transmit and receive data with the computer controller 64 as necessary, to download data to the computer 60, to perform operation processing, and to transmit an operation result of the operation processing to the computer 60.

Each controller (lens unit controller 20, camera body controller 28, computer controller 64, and server controller 84) has circuits required for control processing and includes, for example, an operation processing circuit (central processing unit (CPU) or the like), a memory, and the like. The communication between the camera 10A, the computer 60, and the server 80 may be performed wiredly or wirelessly. The computer 60 and the server 80 may be integrally composed or at least one of the computer 60 or the server 80 may be omitted. The camera 10A may have a communication function with the server 80 such that the camera 10A directly transmits and receives data with the server 80.

Figure 3:
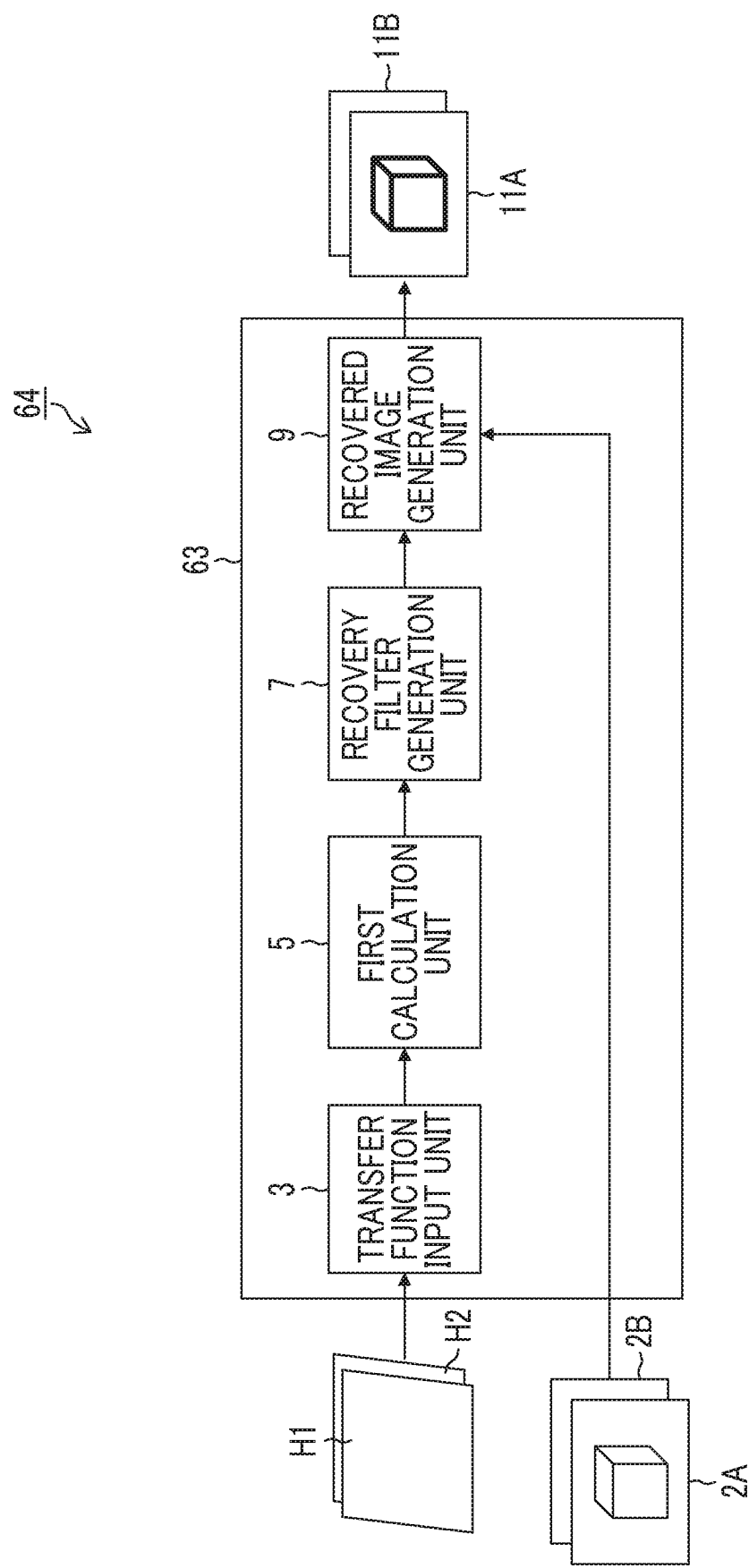
FIG. 3 is a block diagram showing a functional configuration of a computer-side image processing unit (image processing device).

FIG. 3 is a block diagram showing a functional configuration of a computer-side image processing unit (image processing device) 63. The computer-side image processing unit 63 is provided in the computer controller 64.

The computer-side image processing unit 63 comprises a transfer function input unit 3, a first calculation unit (calculation unit) 5, a recovery filter generation unit 7, and a recovered image generation unit 9.

The captured image 2A (captured image data) acquired by the camera 10A and the captured image 2B (captured image data) acquired by the camera 10B are input to the computer-side image processing unit 63 through the input and output interface 32 and the computer input and output unit 62. The captured image 2A and the captured image 2B input to the computer-side image processing unit 63 are input to the recovered image generation unit 9.

The transfer function H1 of the camera 10A and the transfer function H2 of the camera 10B are input to the computer-side image processing unit 63 through the input and output interface 32 and the computer input and output unit 62. The transfer function H1 and the transfer function H2 input to the computer-side image processing unit 63 are input to the transfer function input unit 3.

The first calculation unit 5 calculates the target resolution value which is a target value of the recovery processing that recovers a plurality of the captured images to be output from each of the plurality of imaging systems based on each of the input transfer functions and a calculation criterion (predetermined criterion). Specifically, the first calculation unit 5 calculates the target resolution value of the recovery processing performed with respect to the captured image 2A and the captured image 2B based on the transfer function H1, the transfer function H2, and the calculation criterion described below. Here, the target resolution value refers to, for example, a resolution value to be changed by the recovery processing and a resolution value of a recovered image obtained by performing the recovery processing on the captured image. The target resolution value may be indicated by a resolution value in a certain frequency or a certain frequency band, or may be indicated by a set of discretely sampled resolution values in all frequency bands up to the Nyquist frequency.

The recovery filter generation unit 7 generates a recovery filter to be used for the recovery processing with respect to each of the plurality of imaging systems based on the transfer functions of the plurality of imaging systems and the target resolution value. Specifically, the recovery filter generation unit 7 generates the recovery filter based on the transfer functions H1 and H2, and the target resolution value calculated by the first calculation unit 5.

The recovered image generation unit 9 performs the recovery processing with respect to the captured image acquired by the plurality of imaging systems using the recovery filter generated for each of the plurality of imaging systems to generate the recovered image. Specifically, the recovered image generation unit 9 performs the recovery processing with respect to the captured image 2A using a recovery filter of the camera 10A generated by the recovery filter generation unit 7 to generate a recovered image 11A, and performs the recovery processing with respect to the captured image 2B using a recovery filter of the camera 10B generated by the recovery filter generation unit 7 to generate a recovered image 11B. Here, the recovered image 11A and the recovered image 11B are subjected to the recovery processing to the target resolution value calculated by the first calculation unit 5, and the recovered image 11A and the recovered image 11B have the same resolution value.

Next, the recovery processing will be described.

Figure 4:
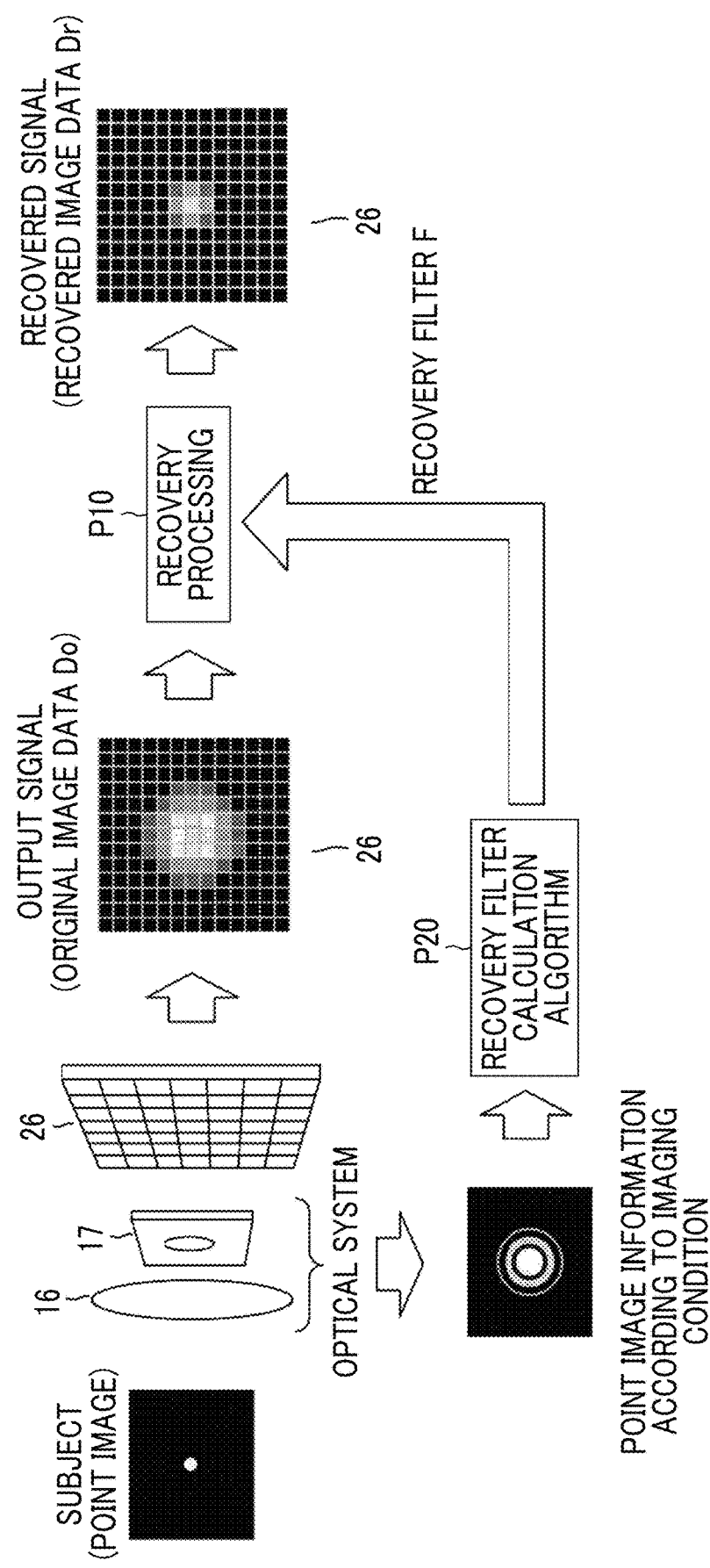
FIG. 4 is a diagram showing an outline from image capturing to recovery processing.

FIG. 4 is a diagram showing an outline from image capturing to the recovery processing. In a case where a point image is captured as the subject, a subject image is received by the imaging element 26 (image sensor) through the optical system (lens 16, stop 17, and the like), and original image data Do is output from the imaging element 26. The original image data Do becomes image data in a state where a native subject image is blurred due to a point spread phenomenon derived from a characteristic of the optical system.

Since the native subject image (point image) is restored (recovered) by the original image data Do of the blurred image, recovered image data Dr representing an image (recovered image) closer to the native subject image (point image) is obtained by performing recovery processing P10 using a recovery filter F with respect to the original image data Do.

The recovery filter F used in the recovery processing P10 is obtained by a predetermined recovery filter calculation algorithm P20 based on point image information (point spread function) of the optical system according to an imaging condition at the time of acquiring the original image data Do. Since the point image information (point spread function) of the optical system may vary due to various imaging conditions such as a stop amount, a focal length, a zoom amount, an image height, the number of recording pixels, and pixel pitch in addition to a type of the lens 16, these imaging conditions are acquired in a case where the recovery filter F is calculated.

As described above, the recovery processing P10 creates the recovered image data Dr from the original image data Do by filtering processing using the recovery filter F. For example, the recovery filter F in a real space composed of N×M (N and M are integers equal to or larger than one) taps is adapted to the image data to be processed. Accordingly, it is possible to calculate pixel data after the recovery processing (recovered image data Dr) by performing a weighted mean operation (deconvolution operation) on a filter coefficient to be assigned to each tap and corresponding pixel data (pixel data to be processed and adjacent pixel data of original image data Do). It is possible to perform the recovery processing by adapting the weighted mean processing using the recovery filter F to all the pixel data constituting the image data, replacing the target pixel in order.

The recovery filter in the real space composed of the N×M taps can be derived by performing inverse Fourier transform on the recovery filter in a frequency space. Therefore, it is possible to calculate the recovery filter in the real space as appropriate by specifying a recovery filter in the frequency space which is a base and designating the number of taps constituting the recovery filter in the real space.

Next, the resolutions of the recovered image 11A and the recovered image 11B generated by the recovered image generation unit 9 will be described.

FIGS. 5, 6, and 7A and 7B are diagrams showing a relationship between an MTF of the captured image 2A, the captured image 2B, the recovered image 11A, and the recovered image 11B and a frequency.

FIG. 5(*i*) shows the relationship between the MTF of the captured image 2A and the frequency, and FIG. 5(*ii*) shows the relationship between the MTF of the recovered image 11A and the frequency in a case where a recovery filter is generated by using a Wiener filter in a generally used form with respect to the captured image 2A and the recovery processing is performed by using the recovery filter. Similarly in FIG. 6, FIG. 6(*i*) shows the relationship between the MTF of the captured image 2B and the frequency, and FIG. 6(*ii*) shows the relationship between the MTF of the recovered image 11B and the frequency in a case where a recovery filter is generated by using the Wiener filter in a generally used form with respect to the captured image 2B and the recovery processing is performed by using the recovery filter. In FIG. 5(ii) and FIG. 6(ii), the MTFs are recovered to the target resolution values indicated by dotted lines by performing the recovery processing. The usage form of the Wiener filter generally used is to generate the recovery filter by using the Wiener filter in a case where the recovery processing is performed with respect to an output image from one camera and does not consider matching of the resolutions between output images in images of the plurality of cameras.

As shown in FIGS. 5 and 6, in the case where the recovery filter is generated by using the Wiener filter in a generally used form and the recovery processing is performed by using the recovery filter, the resolutions between the recovered image 11A of the camera 10A and the recovered image 11B of the camera 10B do not match in many cases since the recovery filter is designed according to the transfer function of each individual of the camera 10A or the camera 10B. That is, there is no guarantee that the recovered image 11A and the recovered image 11B have always the same resolution only by individually adapting the image recovery processing by the Wiener filter to the images. This is because there is a case where a good lens is better but a bad lens does not reach the good lens even in a case where the bad lens is recovered since the Wiener filter optimally recovers an image with a sense of least square.

FIGS. 7A and 7B show the relationship between the MTFs of the captured image 2A and the captured image 2B and the frequencies ((i) of FIG. 7A and (i) of FIG. 7B), and shows the relationship between the MTFs of the recovered image 11A and the recovered image 11B and the frequencies in the case where the recovery processing of the invention is performed ((ii) of FIG. 7A and (ii) of FIG. 7B). Here, in (ii) of FIG. 7A, the recovery filter of the captured image 2A acquired by the camera 10A is generated, and the recovery processing is performed by using the recovery filter based on the target resolution value calculated by the first calculation unit 5, the transfer function H1, and the transfer function H2. In (ii) of FIG. 7B, the same recovery processing is also performed with respect to the captured image 2B acquired by the camera 10B. In (ii) of FIG. 7A and (ii) of FIG. 7B, the MTFs are recovered or moved to the target resolution values indicated by the dotted lines by performing the recovery processing.

As shown in (ii) of FIG. 7A and (ii) of FIG. 7B, in the recovered images on which the recovery processing of the invention is performed, it is possible to match frequency characteristics of the recovered images. That is, since the captured image 2A and the captured image 2B are recovered to the same target resolution value by performing the recovery processing, the resolutions of the recovered image 11A and the recovered image 11B match.

Figure 8:
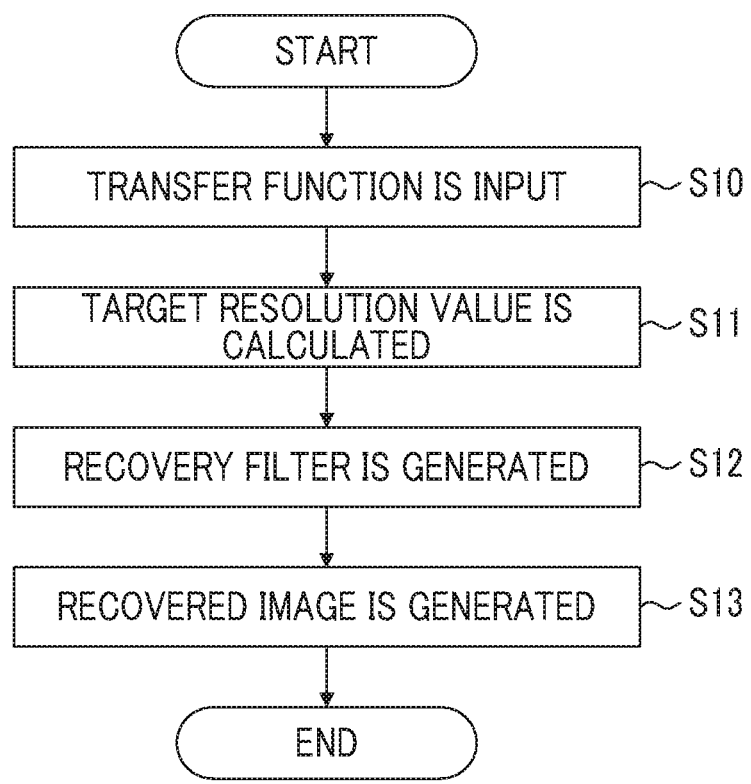
FIG. 8 is a flow diagram showing steps of an image processing method.

FIG. 8 is a flow diagram showing steps of an image processing method of the embodiment of the invention.

First, the transfer functions H1 and H2 of the cameras 10A and 10B are input to the transfer function input unit 3 (transfer function input step: step S10). Next, the first calculation unit 5 calculates a target resolution value based on the input transfer functions H1 and H2, and the calculation criterion (calculation step: step S11). The recovery filter generation unit 7 generates a recovery filter based on the calculated target resolution value (recovery filter generation step: step S12). Thereafter, the recovered image generation unit 9 generates the recovered image 11A by performing the recovery processing with respect to a captured image of each camera using each generated recovery filter (recovered image generation step: step S13).

The configurations and functions described above can be realized as appropriate by predetermined hardware and software, or a combination of both. For example, it is possible to adapt the invention to a program causing the computer 60 to execute the processing steps (processing procedure) described above and a computer-readable recording medium (non-transitory recording medium) that records such a program, or to the computer 60 on which such a program can be installed.

In the embodiment, a hardware structure of the processing unit executing various pieces of processing is the following various processors. The various processors include the CPU which is a general processor executing software (program) to function as various processing units, a programmable logic device (PLD) which is a processor, such as a field programmable gate array (FPGA), whose circuit configuration is changeable after manufacturing, dedicated circuitry which is a processor, such as an application specific integrated circuit (ASIC), having an exclusively designed circuit configuration for executing specific processing, and the like.

One processing unit may be composed of one of these various processors, or of two or more processors having the same type or different types (for example, a plurality of FPGAs, or combination of CPU and FPGA). A plurality of processing units may be composed of one processor. As examples that the plurality of processing units are composed of one processor, firstly, one processor is composed of a combination of one or more CPUs and software, and the processor functions as the plurality of processing units, as represented by the computer such as a client and a server. Secondly, a processor that realizes the functions of the entire system including the plurality of processing units in one integrated circuit (IC) chip is used, as represented by a system on chip (SoC) or the like. In this manner, the various processing units are composed by using the various one or more processors described above as the hardware structure.

More specifically, the hardware structure of these various processors is circuitry combining circuit elements such as a semiconductor element.

Second Embodiment

Next, a second embodiment will be described.

Figure 9:
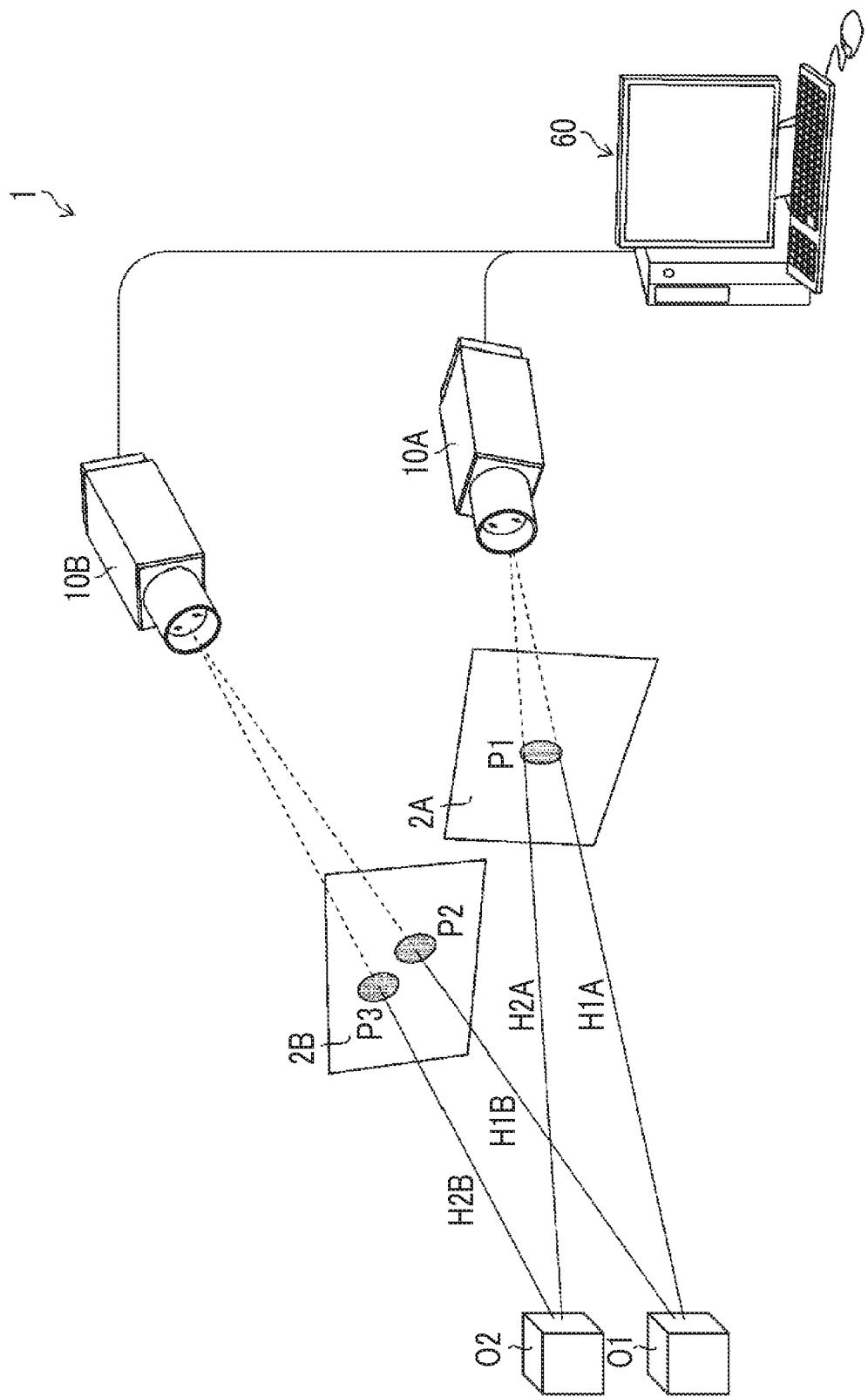
FIG. 9 is a diagram conceptually showing a camera system.

FIG. 9 is a diagram conceptually showing the camera system 1 of the embodiment. The same number is assigned to the portion already described in FIG. 1, and the description thereof is omitted.

The camera system 1 of the embodiment is composed of the camera 10A, the camera 10B, and the computer (control device) 60. The camera 10A acquires the captured image 2A, and the camera 10B acquires the captured image 2B.

The camera 10A captures a subject O1 and a subject O2, and the camera 10B captures the subject O1 and the subject O2. Here, the subject O1 and the subject O2 are subjects having different subject distances for the cameras 10A and 10B. The camera 10A captures the subject O1 and the subject O2 having different subject distances, but images of the subject O1 and the subject O2 are overlapped in the captured image 2A and are projected at a position of P1. The camera 10A captures the subject O1 with a transfer function H1A and captures the subject O2 with a transfer function H2A.

The camera 10B captures the subject O1 and the subject O2 having different subject distances, and images of the subject O1 and the subject O2 are not overlapped in the captured image 2B. The image of the subject O1 is projected at a position of P2, and the image of the subject O2 is projected at a position of P3. The camera 10B captures the subject O1 with a transfer function H1B and captures the subject O2 with a transfer function H2B.

In this manner, the subject O1 and the subject O2 are respectively projected at different positions P2 and P3 in the camera 10B, but the subject O1 and the subject O2 are projected at position P1 in an overlapped manner in the camera 10A. Therefore, it is difficult to determine whether an image is the image of the subject O1 or the image of the subject O2 at position P1 only with the image data of the captured image 2A. In this case, in a case where the target resolution value is calculated from each transfer function as in the first calculation unit 5 described above, the resolutions between the camera 10A and the camera 10B may be largely deviated since it is impossible in principle for the first calculation unit 5 to constitute a recovery filter that matches the resolutions simultaneously in both the transfer function H1A and the transfer function H2A. In such a case, a weight ($\beta$) that takes priority balance for matching the resolutions is introduced to calculate the target resolution value. However, in the description of the embodiment, a case where an imaging condition, such as the subject distances of the subject O1 and the subject O2 for the cameras 10A and 10B, can be specified by another means is not assumed since it is possible to match the resolutions by switching the filters according to the imaging conditions.

Figure 10:
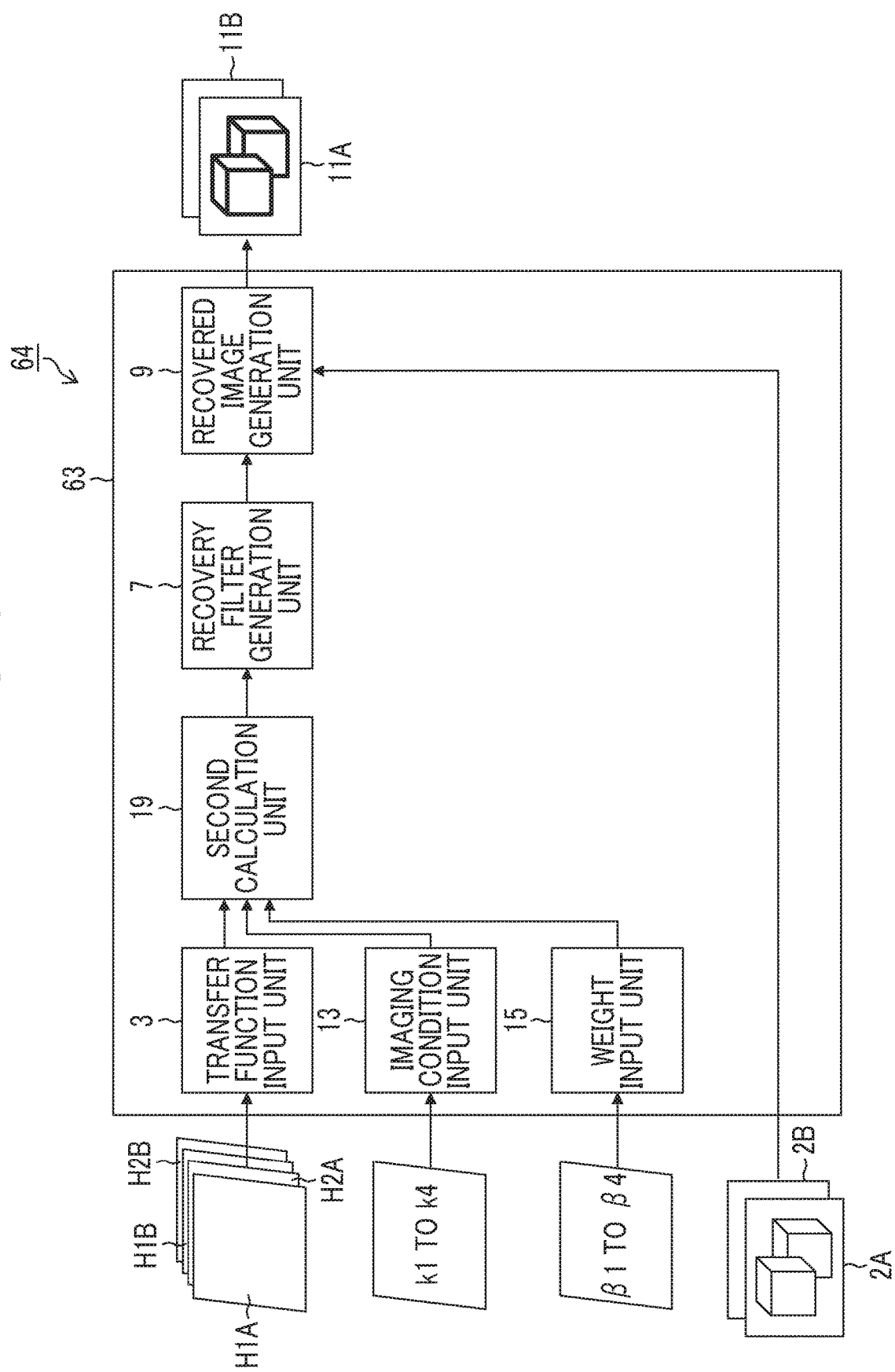
FIG. 10 is a block diagram showing a functional configuration of a computer-side image processing unit (image processing device).

FIG. 10 is a block diagram showing a functional configuration of a computer-side image processing unit (image processing device) 63. The computer-side image processing unit 63 is provided in the computer controller 64.

The computer-side image processing unit 63 comprises the transfer function input unit 3, an imaging condition input unit 13, a second calculation unit 19, the recovery filter generation unit 7, the recovered image generation unit 9, and a weight input unit 15. The same reference number is assigned to the portion already described in FIG. 3, and the description thereof is omitted.

The imaging condition input unit 13 receives each imaging condition of the plurality of imaging systems. Here, the imaging condition refers to information on an imaging condition affecting the transfer function such as the subject distance or the stop 17. In the case shown in FIG. 9, for example, a subject distance (k1) of the subject O1 and a subject distance (k2) of the subject O2 in the camera 10A are input, and the subject distance of the subject O1 (k3) and the subject distance of the subject O2 (k4) in the camera 10B are input. Here, in the case where there are a plurality of subjects, it is considered that there are a plurality of different imaging conditions (subject distances) and there are the plurality of imaging conditions depending on the plurality of subjects.

A transfer function according to an imaging condition input to the imaging condition input unit 13 is input to the transfer function input unit 3. Specifically, the transfer function H1A, the transfer function H2A, the transfer function H1B, and the transfer function H2B according to each subject distance are input to the transfer function input unit 3.

The weight input unit 15 receives the weight representing a degree of matching with the target resolution value according to each imaging condition input to the imaging condition input unit 13. That is, the weight is input to the weight input unit 15 according to a degree of importance of each imaging condition. For example, weights 131 to 34 are input according to imaging conditions k1 to k4. For example, a value set in advance in the second calculation unit may be used as the weight to be input to the weight input unit 15.

The second calculation unit 19 calculates the target resolution value which is a target value of the recovery processing that recovers a plurality of the captured images to be output from each of the plurality of imaging systems based on the input transfer functions, each of the input imaging conditions, and a calculation criterion (predetermined criterion).

Figure 11:
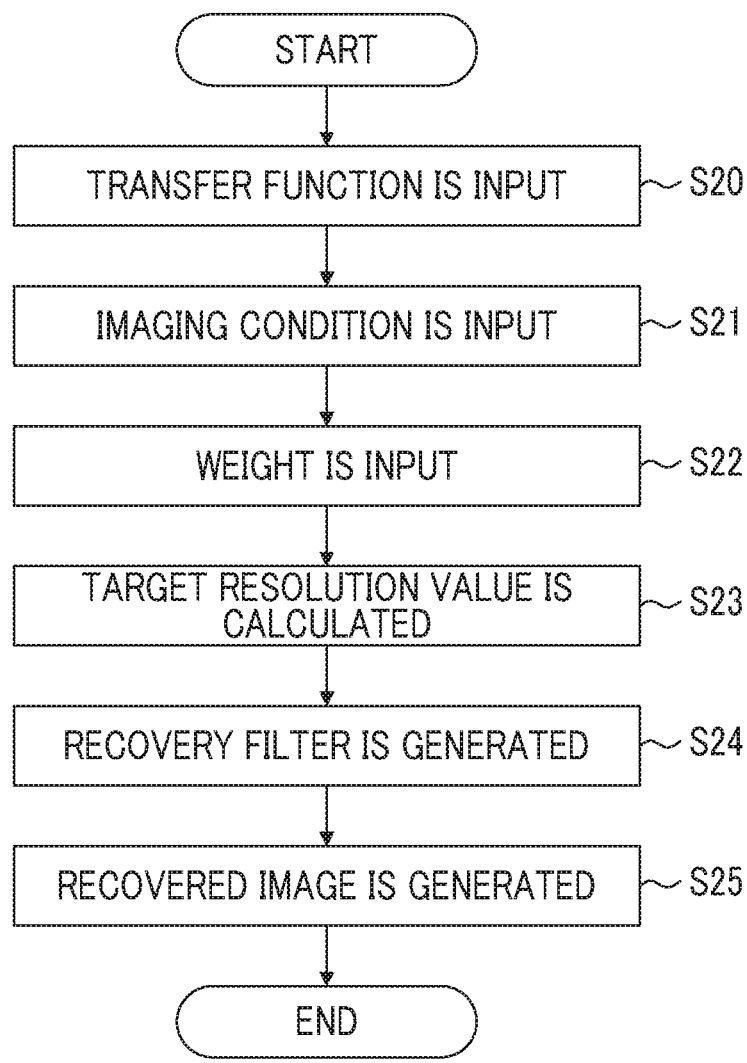
FIG. 11 is a flow diagram showing steps of an image processing method.

FIG. 11 is a flow diagram showing steps of an image processing method of the embodiment of the invention.

First, the transfer function H1A, the transfer function H2A, the transfer function H1B, and the transfer function H2B of the cameras 10A and 10B are input to the transfer function input unit 3 (transfer function input step: step S20). Next, an imaging condition is input to the imaging condition input unit 13 (imaging condition input step: step S21), and a weight for each imaging condition is input to the weight input unit 15 (weight input step: step S22). Next, the second calculation unit 19 calculates a target resolution value based on the imaging condition, the transfer function, the weight, and the calculation criterion (calculation step: step S23). The recovery filter generation unit 7 generates a recovery filter based on the calculated target resolution value (recovery filter generation step: step S24). Thereafter, the recovered image generation unit 9 performs the recovery processing with respect to the captured image of each camera by using each of the generated recovery filters to generate the recovered image 11A and the recovered image 11B (recovered image generation step: step S25).

<Calculation of Target Resolution Value and Generation of Recovery Filter>

Next, a specific calculation example performed by the first calculation unit 5, the second calculation unit 19, and the recovery filter generation unit 7 will be described.

<Derivation of Wiener Filter>

First, a case where a recovery filter is generated by the Wiener filter with respect to an output image of one camera (imaging system) will be described. In the following description, a character indicated by " " parentheses and a bold character in equation indicate vectors or matrices, and others are used separately to indicate scalars.

A source image (ideal image) is set as "x", an image deteriorated by the imaging system is set as "y", and an optical transfer function (two-dimensional impulse response) of the imaging system is set as "h". In this case, in a case where an additive noise vector mixed by the imaging system is set as "n", an observation model can be expressed as the following equation.

$$y = h * x + n \qquad \text{[Formula 1]}$$

Here, * indicates two-dimensional convolution. The optical transfer function generally changes depending on an image height. However, in the above equation, focuses are made on a minute region where the change of the transfer function can be ignored, and it is assumed that it can be regarded as a movement invariant system.

In a case where Fourier transform is adapted to both sides of the above equation, the following equation is obtained.

$$Y(\omega_x, \omega_y) = H(\omega_x, \omega_y) X(\omega_x, \omega_y) + N(\omega_x, \omega_y) \qquad \text{[Formula 2]}$$

Here, an uppercase variable is a frequency component at a spatial frequency $$(\omega_x, \omega_y) \qquad \text{[Formula 3]}$$

of a lowercase variable.

In a case where a two-dimensional impulse response of a Wiener recovery filter (recovery filter) is set as "f" and a recovered image is set as "z", an image recovery process can be expressed as the following equation.

$$z = f * y \quad \text{[Formula 4]}$$

Similarly, in a case where the Fourier transform is adapted to the above equation, the following equation is obtained.

$$Z(\omega_x, \omega_y) = F(\omega_x, \omega_y) Y(\omega_x, \omega_y) \quad \text{[Formula 5]}$$

An image recovery criterion of the Wiener recovery filter is a mean square error J of the source image and the recovered image defined below.

$$J = E_x E_n \|x - z\|^2 \quad \text{[Formula 6]}$$

Here, Ex is amplitude of a signal of the image "x", and En is amplitude of a signal of the noise "n". Since the image "x" and the noise "n" are uncorrelated, the equation can be changed as follows.

$$J = E_x E_n \|x - f*h*x + f*n\|^2 = E_x \|(1 - f*h)*x\|^2 + E_n \|f*n\|^2 \quad \text{[Formula 7]}$$

In the above equation, it is assumed that a notation "1" is a vector where a size thereof is equal to "f" *"h" and always "1" *"x"="x" (only the center is 1 and other elements are 0). In a case where the Fourier transform is adapted to the above equation, the following equation is obtained.

$$J = \iint E_x \|\{1 - F(\omega_x, \omega_y) H(\omega_x, \omega_y)\} X(\omega_x, \omega_y)\|^2 + E_N \|F(\omega_x, \omega_y) N(\omega_x, \omega_y)\|^2 d\omega_x d\omega_y \quad \text{[Formula 8]}$$

Furthermore, in a case where mean signal power S is set as $$S(\omega_x, \omega_y) = E_X \|X(\omega_x, \omega_y)\|^2 \quad \text{[Formula 9]}$$

and mean noise power N is set as $$N(\omega_x, \omega_y) = E_N \|N(\omega_x, \omega_y)\|^2 \quad \text{[Formula 10]},$$

the following equation is obtained.

$$J = \iint \|1 - F(\omega_x, \omega_y) H(\omega_x, \omega_y)\|^2 S(\omega_x, \omega_y) + \|F(\omega_x, \omega_y)\|^2 N(\omega_x, \omega_y) d\omega_x d\omega_y \quad \text{[Formula 11]}$$

In order to minimize the above equation for the frequency characteristic of the recovery filter, in a case where the equation is partially differentiated with respect to $$F^* \quad \text{[Formula 12]}$$

and is set to zero, $$2F(\omega_x, \omega_y) \|H(\omega_x, \omega_y)\|^2 S(\omega_x, \omega_y) - 2H^*(\omega_x, \omega_y) S(\omega_x, \omega_y) + 2F(\omega_x, \omega_y) N(\omega_x, \omega_y) = 0 \quad \text{[Formula 13]}$$

is obtained, and accordingly, the frequency characteristic of the Wiener recovery filter is obtained as follows.

$$F(\omega_x, \omega_y) = \frac{H^*(\omega_x, \omega_y)}{\|H(\omega_x, \omega_y)\|^2 + N(\omega_x, \omega_y)/S(\omega_x, \omega_y)} \quad \text{[Formula 14]}$$

Here, it is assumed that $$H^*(\omega_x, \omega_y) \quad \text{[Formula 15]}$$

is complex conjugate of $$H(\omega_x, \omega_y) \quad \text{[Formula 16]}$$

and $$\|H(\omega_x, \omega_y)\| = \sqrt{H(\omega_x, \omega_y) H^*(\omega_x, \omega_y)} \quad \text{[Formula 17]}$$

Since the recovery filter is mounted as a two-dimensional FIR filter with the limited number of taps in mounting, a filter tap coefficient "f" that optimally approximates the frequency characteristic $$F(\omega_x, \omega_y) \quad \text{[Formula 18]}$$

is obtained using an optimization method with a predetermined known constraint condition.

<Derivation of Resolution Matching Wiener Filter>

Next, the calculations in the first calculation unit 5 and the recovery filter generation unit 7 of the first embodiment will be described.

The calculation criterion used by the first calculation unit 5 minimizes "an error between the recovered images in the entire plurality of imaging systems and the ideal images before being deteriorated in the imaging systems with a precondition of matching the resolution values of the recovered images of the plurality of imaging systems". For example, the first calculation unit 5 calculates the target resolution value based on a criterion of minimizing a total value of the square errors between the recovered images and the ideal images. Hereinafter, details will be described.

It is assumed that an index of the plurality of imaging systems (cameras) is expressed as i ($1 \leq i \leq M$), a corresponding optical transfer function (two-dimensional impulse response) actually measured is expressed as "$h_i$", and a frequency characteristic thereof is expressed as follows.

$$H_i(\omega_x, \omega_y) \quad \text{[Formula 19]}$$

In this case, frequency characteristics of images (recovered images) after the adaption of the recovery filter in each imaging system are required to be matched. In a case where a total (including deterioration and recovery) frequency response after the adaption of the recovery filter is set as R (constant), there is a need to be $$H_i(\omega_x, \omega_y) F_i(\omega_x, \omega_y) = R (1 \leq i \leq M) \quad \text{[Formula 20]}$$

That is, this means that the frequency characteristic of the recovery filter is uniquely decided by using a parameter R as the following equation.

$$F_i(\omega_x, \omega_y) = \frac{R}{H_i(\omega_x, \omega_y)} \ (1 \leq i \leq M) \quad \text{[Formula 21]}$$

The frequency characteristic of the recovery filter of each imaging system is uniquely decided by the above equation as long as a value of R is decided. In order to decide the value of R, a mean square error criterion of the source image and the recovered image is used similarly to the case of the Wiener filter. However, it is assumed that a weighted sum of the square errors in the plurality of imaging systems is used herein.

$$J = \sum_{i=1}^{M} E_{x_i} E_n w_i \|x_i - z_i\|^2 \quad \text{[Formula 22]}$$

However, $$y_i = h_i * x_i + n_i \quad \text{[Formula 23]}$$

$$z_i = f_i * y_i \quad \text{[Formula 24]}$$

The $w_i$ ($\geq 0$) is a weighted coefficient for assigning priority in a degree of the recovery of the imaging system and is set to $w_i = 1$ in a case where there is no need to assign the priority.

In a case where the Fourier transform is adapted to J described above, the following equation is obtained.

$$J = \sum_{i=1}^{M} w_i \iint \|1 - F_i(\omega_x, \omega_y) H_i(\omega_x, \omega_y)\|^2 S(\omega_x, \omega_y) + \quad \text{[Formula 25]}$$
$$\|F_i(\omega_x, \omega_y)\|^2 N(\omega_x, \omega_y) d\omega_x d\omega_y$$
$$= \sum_{i=1}^{M} w_i \iint (1-R)^2 S(\omega_x, \omega_y) + \quad \text{[Formula 26]}$$
$$\frac{R^2}{\|H_i(\omega_x, \omega_y)\|^2} N(\omega_x, \omega_y) d\omega_x d\omega_y$$

Here, it is assumed that the mean signal power and the mean noise power are constant without depending on the imaging system. In order to minimize the above equation for R, in a case where the equation is partially differentiated with respect to R and is set to zero, the following equation is obtained.

$$R = \frac{\|\tilde{H}(\omega_x, \omega_y)\|^2}{\|\tilde{H}(\omega_x, \omega_y)\|^2 + N(\omega_x, \omega_y)/S(\omega_x, \omega_y)} \quad \text{[Formula 27]}$$

Here, $$\|\tilde{H}(\omega_x, \omega_y)\|^2 \quad \text{[Formula 28]}$$

is weighted harmonic mean of the transfer function $$\|H_i(\omega_x, \omega_y)\|^2 \quad \text{[Formula 29]}$$

defined below.

$$\sum_{i=1}^{M} \frac{w_i}{\|H_i(\omega_x, \omega_y)\|^2} = \left(\sum_{i=1}^{M} w_i\right) \frac{1}{\|\tilde{H}(\omega_x, \omega_y)\|^2} \quad \text{[Formula 30]}$$

With R (target resolution value) obtained in this manner, the frequency characteristic of the recovery filter is finally expressed as follows.

$$F_i(\omega_x, \omega_y) = \frac{\|\tilde{H}(\omega_x, \omega_y)\|^2 / \|H_i(\omega_x, \omega_y)\|^2 H_i^*(\omega_x, \omega_y)}{\|H_i(\omega_x, \omega_y)\|^2 + N(\omega_x, \omega_y)/S(\omega_x, \omega_y)} \quad \text{[Formula 31]}$$

With the use of the "resolution matching Wiener filter" defined in this manner, it is possible to obtain a merit that the frequency characteristics after the recovery always match and to obtain a merit of the existing Wiener filter that a recovery amount is optimally adjusted in consideration of an SN ratio of the imaging system.

<Weighted Resolution Matching in Plurality of Imaging Conditions>

Next, the calculations in the second calculation unit 19 and the recovery filter generation unit 7 in the second embodiment will be described.

The calculation criterion used by the second calculation unit 19 minimizes "a weighted error between the recovered images in the entire imaging conditions of the entire plurality of imaging systems and the ideal images before being deteriorated in the imaging systems with a precondition of minimizing a difference between the resolution values of the recovered images of the plurality of imaging systems and the target resolution value while the weight according to the imaging condition is adapted". Hereinafter, details will be described.

In the method described above, since there is one subject (imaging condition) whose resolutions are desired to be matched, it is possible to constitute a recovery filter so as to always match the resolutions. Here, a case where there are a plurality of the subjects whose resolutions are desired to be matched is considered. In this case, in a case where the subjects are displayed on a screen at positions where all positions of the subjects are not overlapped (different), it is possible to match the resolutions of all the subjects in the same manner as described above. On the other hand, in a case where places, projected on the screen, of the subjects whose resolutions are desired to be matched are overlapped with each other, there is a problem that it is impossible in principle to constitute a recovery filter that matches all the resolutions (however, there is no such a problem under a condition that an image processing system can recognize a position of the subject, that is, an imaging condition and the plurality of subjects are not captured simultaneously).

Hereinafter, a method of designing a filter with well-balanced performance by introducing a weighted coefficient β indicating the degree of importance of each subject (imaging condition) and by changing strength of a degree of matching to a target resolution according to the magnitude of the coefficient is considered. Further, hereinafter, since a difference in the transfer function due to a difference in position (distance) of the subject is equivalent to the change in the imaging condition and the change in the imaging condition such as the stop can also be considered additionally, the plurality of subjects can be regarded as a difference in the imaging condition.

It is assumed that an index of the plurality of imaging systems is expressed as i ($1 \leq i \leq M$), an index of the imaging condition where the resolutions are desired to be matched simultaneously is expressed as k ($1 \leq k \leq N$), and an index indicating an on-screen position of the subject is expressed as p ($1 \leq p \leq P$). In this case, it is assumed that an optical transfer function measured by using these indices is $$H_{i,p,k}(\omega_x, \omega_y) \quad \text{[Formula 32]}$$

and the frequency response of the recovery filter is $$F_{i,p}(\omega_x, \omega_y) \quad \text{[Formula 33]}$$

Since "the resolutions are desired to be matched" means that the resolutions are desired to be matched to a specific resolution individually for each on-screen position p and imaging condition k, it is considered as a problem that a value of the target resolution (target resolution value) is assumed as $$R_{k,p}(\omega_x, \omega_y) \quad \text{[Formula 34]}$$

and this value is obtained from an approximate weight β and a Wiener's criterion. In the following description, in order to simplify the notation, the index p and the spatial frequency $$\omega_x, \omega_y \quad \text{[Formula 35]}$$

which may be considered for the specific value are omitted and these are respectively expressed as $$H_{i,k}, F_i, R_k \quad \text{[Formula 36]}$$

As described above, since it is impossible to generally match the resolutions on all the imaging conditions, it is assumed that a weight $\beta_{i,k}$ indicating the precision of the resolution matching for all combinations of the imaging system i and the imaging condition k is considered. An evaluation criterion "$J_1$" for the resolution matching is expressed as follows using the weight $\beta_{i,k}$.

$$J_1 = \sum_{i,k} \beta_{i,k} \|H_{i,k} F_i - R_k\|^2 = \sum_i \|\varphi_i F_i - r\|_{B_i}^2 \qquad \text{[Formula 37]}$$

The vector, matrix, and weighted matrix norm introduced in the above equation are defined as follows.

$$\varphi_i = \begin{bmatrix} H_{i,1} \\ H_{i,2} \\ \vdots \\ H_{i,N} \end{bmatrix} \qquad \text{[Formula 38]}$$

$$r = \begin{bmatrix} R_1 \\ R_2 \\ \vdots \\ R_N \end{bmatrix} \qquad \text{[Formula 39]}$$

$$B_i = \begin{bmatrix} \beta_{i,1} & 0 & \cdots & 0 \\ 0 & \beta_{i,2} & & 0 \\ \vdots & & \ddots & \vdots \\ 0 & 0 & \cdots & \beta_{i,N} \end{bmatrix} \qquad \text{[Formula 40]}$$

$$\|x\|_Q^2 = x^H q x \qquad \text{[Formula 41]}$$

Here, "$x^H$" indicates Hermitian transpose of "$x$". In order to obtain a recovery filter frequency response that minimizes the value of "$J_1$", in a case where $$\frac{\partial J_1}{\partial F_i} = 0 \qquad \text{[Formula 42]}$$

"$F_1$" is decided as follows.

$$F_i = \frac{\varphi_i^H B_i r}{\varphi_i^H B_i \varphi_i} = t_i^H r \left( t_i = \frac{B_i \varphi_i}{\varphi_i^H B_i \varphi_i} \right) \qquad \text{[Formula 43]}$$

The frequency characteristic of the recovery filter of each imaging system is uniquely decided by the above equation as long as a value of "$r$" is decided. In order to decide the value of "$r$", a criterion that minimizes mean square error between the source image and the recovered image is used similarly to the case of the Wiener filter. However, it is assumed a weighted addition of all the square errors in the plurality of imaging systems i and a plurality of imaging conditions k is used herein. In a case where this is set as $J_2[r]$, it is possible to express $J_2[r]$ as the following equation.

$$J_2[r] = \sum_{i,k} w_{i,k} \int\int \|1 - F_i H_{i,k}\|^2 S + \qquad \text{[Formula 44]}$$
$$\|F_i\|^2 N \, d\omega_x d\omega_y$$

$$= \sum_{i,k} w_{i,k} \int\int \|1 - H_{i,k} t_i^H r\|^2 S + \qquad \text{[Formula 45]}$$
$$\|t_i^H r\|^2 N \, d\omega_x d\omega_y$$

-continued $$= \int\int J_3[r] \, d\omega_x d\omega_y \qquad \text{[Formula 46]}$$

Here, $w_{i,k}$ ($\geq 0$) is a weighted coefficient for assigning priority in a degree of the recovery of the imaging system. In the above equation, the spatial frequency $$\omega_x, \omega_y \qquad \text{[Formula 47]}$$

is omitted in S and N similarly to other equations. In a case where a term to be integrated by $$\omega_x, \omega_y \qquad \text{[Formula 48]}$$

in $J_2[r]$ is set as $J_3[r]$ and it is assumed that $[r]$ can also be independently decided depending on $$\omega_x, \omega_y \qquad \text{[Formula 49]},$$

it is considered as a problem of independently minimizing only $J_3[r]$ in each spatial frequency. Therefore, the minimization of $J_3[r]$ is considered in the following description. In a case where the functional $J_3[r]$ is varied by $[r]$ and is set to zero, it is understood that optimal $[r]$ satisfies the following equation.

$$J_3[r + \Delta r] - J_3[r] = \qquad \text{[Formula 50]}$$
$$2\text{Re} \sum_{i,k} w_{i,k} \{(\|H_{i,k}\|^2 S + N) t_i^H r - H_{i,k}^* S\}(t_i^T \Delta r) = 0$$

In order for this equation to be established with respect to predetermined $\Delta r$, the following equation is required to be established with respect to all the imaging systems i ($1 \leq i \leq M$).

$$\sum_{k=1}^N w_{i,k}(\|H_{i,k}\|^2 S + N) t_i^H r = S \sum_{k=1}^N w_{i,k} H_{i,k}^* \qquad \text{[Formula 51]}$$

In order for all the imaging systems i ($1 \leq i \leq M$) to simultaneously satisfy this condition, the following matrix equation for $[r]$ is obtained by setting up simultaneous equations of the above equations.

$$Ar = u \qquad \text{[Formula 52]}$$

$$A = \begin{bmatrix} \sum_k w_{1,k}(\|H_{1,k}\|^2 S + N) t_1^H \\ \sum_k w_{2,k}(\|H_{2,k}\|^2 S + N) t_2^H \\ \vdots \\ \sum_k w_{M,k}(\|H_{M,k}\|^2 S + N) t_M^H \end{bmatrix} \qquad \text{[Formula 53]}$$

$$u = S \begin{bmatrix} \sum_k w_{1,k} H_{1,k}^* \\ \sum_k w_{2,k} H_{2,k}^* \\ \vdots \\ \sum_k w_{M,k} H_{M,k}^* \end{bmatrix} \qquad \text{[Formula 54]}$$

Here, "A" is an M×N complex matrix, and "u" is an M-dimensional complex column vector. In general, in a case where N<M or rank A<M, there is no [r] satisfying the above equation. In a case where N=M and rank A=M, the optimal [r] is uniquely decided. In a case where N>M and rank A=M, the optimal [r] is not uniquely decided but it is possible to obtain a norm minimum solution by general inverse. In a case where N≥M and rank A=M, the optimal [r] can be obtained by the following equation.

$$r = A^+ u \quad \text{[Formula 55]}$$

Here, "A+" is Moore-Penrose general inverse of "A". Using this equation, a frequency response of an optimal recovery filter in an imaging system i required to be obtained can be expressed by the following equation.

$$F_i = \frac{\varphi_i^H B_i A^+ u}{\varphi_i^H B_i \varphi_i} \quad \text{[Formula 56]}$$

Modification Example 1

Next, modification example 1 of the invention will be described. In this example, the image processing unit (image processing device) is provided in the cameras 10A and 10B instead of the control device (computer 60) of the camera system 1.

Figure 12:
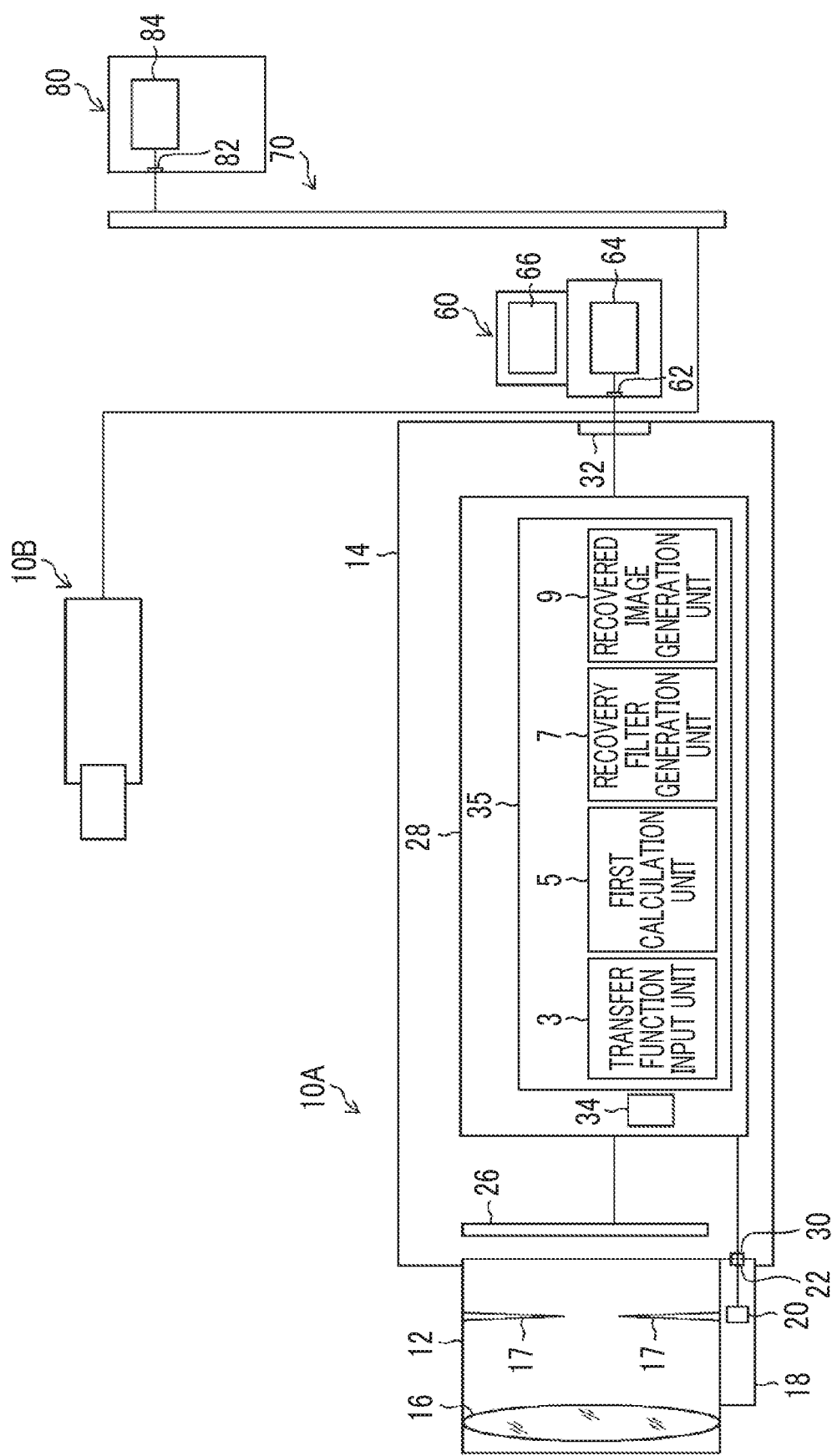
FIG. 12 is a diagram conceptually showing a camera system.

FIG. 12 is a conceptual diagram showing the camera system 1 of this example. The same number is assigned to the portion already described in FIG. 3, and the description thereof is omitted. Since the camera 10B has the same configuration as the camera 10A, the exemplification thereof is omitted.

The image processing unit 35 is provided with the transfer function input unit 3, the first calculation unit 5, the recovery filter generation unit 7, and the recovered image generation unit 9 described in FIG. 3.

In the case of the description in FIG. 12, the image processing unit 35 of the camera 10A is provided with the transfer function input unit 3, the first calculation unit 5, the recovery filter generation unit 7, and the recovered image generation unit 9. The image processing unit 35 of the camera 10B is also provided with the transfer function input unit 3, the first calculation unit 5, the recovery filter generation unit 7, and the recovered image generation unit 9 (not shown).

In this case, the target resolution value of the camera 10A and the target resolution value of the camera 10B may be calculated by the first calculation unit 5 of the camera 10A, or the target resolution value of the camera 10A may be calculated by the first calculation unit 5 of the camera 10A and the target resolution value of the camera 10B may be calculated by the first calculation unit 5 of the camera 10B. The camera 10A and the camera 10B are connected wiredly or wirelessly and can exchange data with each other.

In FIG. 12, the case where the cameras 10A and 10B are provided with the transfer function input unit 3, the first calculation unit 5, the recovery filter generation unit 7, and the recovered image generation unit 9 is described. However, only the image processing unit 35 of the camera 10A may be provided with the transfer function input unit 3, the first calculation unit 5, the recovery filter generation unit 7, and the recovered image generation unit 9.

Modification Example 2

Next, modification example 2 of the invention will be described. In this example, a recovery filter is generated by the recovery filter generation method (steps S10 to S12 in FIG. 8) described above and the generated recovery filter is set in advance in the camera system 1.

Figure 13:
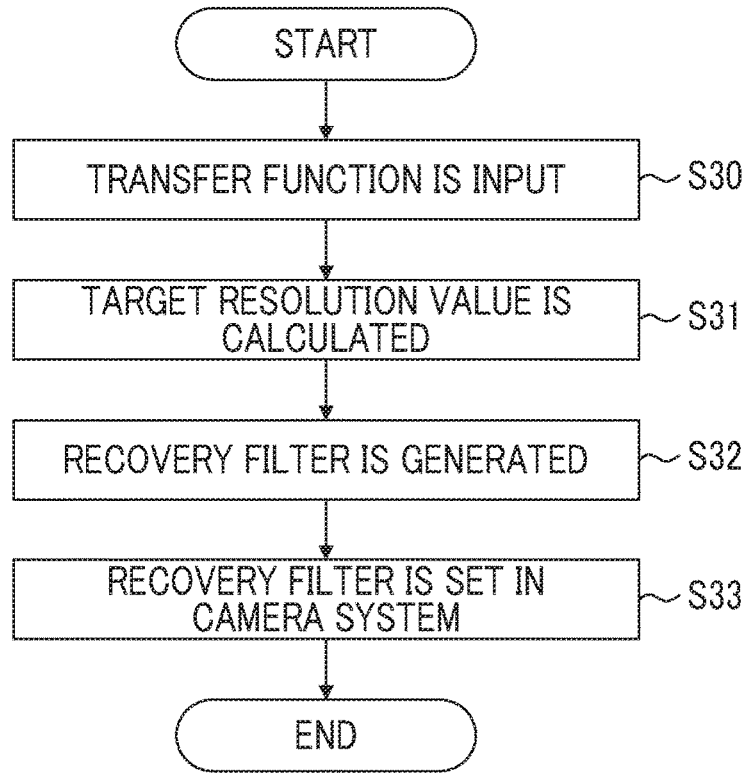
FIG. 13 is an operation flow diagram in a case where a recovery filter is set to the camera system.

FIG. 13 is an operation flow diagram in a case where a recovery filter is set to the camera system 1 of this example.

First, the transfer functions H1 and H2 of the cameras 10A and 10B are input to the transfer function input unit 3 (transfer function input step: step S30). Next, the first calculation unit 5 calculates a target resolution value based on the input transfer functions H1 and H2, and a criterion (calculation step: step S31). The recovery filter generation unit 7 generates a recovery filter based on the calculated target resolution value (recovery filter generation step: step S32). Thereafter, the generated recovery filter is set (stored) in the camera system 1 (step S33). The camera system 1 stores the recovery filter in an appropriate portion. That is, the recovery filter may be stored in the cameras 10A and 10B constituting the camera system 1, or may be stored in the computer 60.

In the above description, this example is adapted to the case of the recovery filter generation method according to the first embodiment. However, this example is also adapted to the case of the recovery filter generation method according to the second embodiment (FIG. 11).

Modification Example 3

Next, modification example 3 of the invention will be described. In this example, a target resolution value is decided by the target resolution value calculation method (steps S10 to S11 in FIG. 8) described above and the target resolution value is set in advance in the camera system 1.

Figure 14:
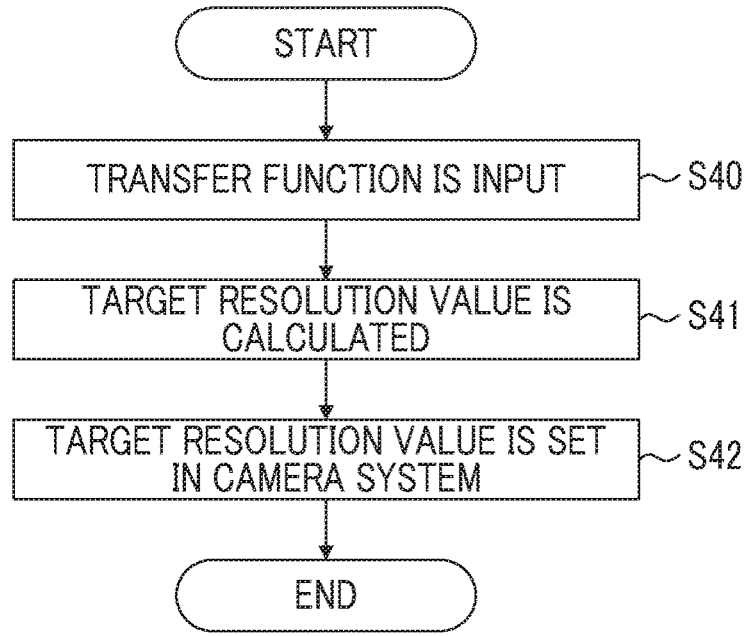
FIG. 14 is an operation flow diagram in a case where a target resolution value is set to the camera system.

FIG. 14 is an operation flow diagram in a case where a target resolution value is set to the camera system 1 of this example.

First, the transfer functions H1 and H2 of the cameras 10A and 10B are input to the transfer function input unit 3 (transfer function input step: step S40). Next, the first calculation unit 5 calculates a target resolution value based on the input transfer functions H1 and H2, and a criterion (calculation step: step S41). Thereafter, the calculated target resolution value is set (stored) in the camera system 1 (step S42). The camera system 1 stores the target resolution value in an appropriate portion. For example, the target resolution value may be stored in the cameras 10A and 10B constituting the camera system 1, or may be stored in the computer 60.

In the above description, this example is adapted to the case of the recovery filter generation method according to the first embodiment. However, this example is also adapted to the case of the recovery filter generation method according to the second embodiment (FIG. 11).

According to the embodiments described above, since the target resolution value for the plurality of imaging systems is calculated by using the predetermined criterion, the recovery filter is generated based on the calculated target resolution value, and the recovery processing is performed by the generated recovery filter, it is possible to obtain the images with the matching frequency characteristic and good image quality in the images output from the plurality of imaging systems.

The examples of the invention are described. However, it goes without saying that the invention is not limited to the embodiments described above and various modifications can be made without departing from the spirit of the invention.

EXPLANATION OF REFERENCES

1: camera system
2A, 2B: captured image
3: transfer function input unit
5: first calculation unit
7: recovery filter generation unit
9: recovered image generation unit
10A, 10B: camera
11A, 11B: recovered image
12: lens unit
13: imaging condition input unit
14: camera body
15: weight input unit
16: lens
17: stop
18: optical system operation unit
19: second calculation unit
20: lens unit controller
22: lens unit input and output unit
26: imaging element
28: camera body controller
30: camera body input and output unit
32: input and output interface
34: device control unit
35: image processing unit
60: computer
62: computer input and output unit
63: computer-side image processing unit
64: computer controller
66: display
70: Internet
80: server
82: server input and output unit
84: server controller
S10 to S13: image processing method according to first embodiment
S20 to S25: image processing method according to second embodiment
S30 to S33: recovery filter generation method
S40 to S42: target resolution value calculation method

What is claimed is:

1. An image processing device comprising:
a processor configured to:
input each of transfer functions of a plurality of imaging systems;
calculate a target resolution value which is a target value of recovery processing that recovers a plurality of captured images to be output from each of the plurality of the imaging systems, the target resolution value minimizing an error between the recovered images for all of the plurality of imaging systems and ideal images before being deteriorated for all of the plurality of imaging systems in order to match resolution values of the recovered images of the plurality of imaging systems;
generate a recovery filter used for the recovery processing for each of the plurality of imaging systems based on each of the transfer functions of the plurality of imaging systems and the target resolution value; and
perform the recovery processing for the plurality of captured images acquired from the plurality of imaging systems by using the recovery filter generated for each of the plurality of imaging systems to generate recovered images.

2. An image processing device comprising:
a processor configured to:
input each of transfer functions of a plurality of imaging systems;
input each of imaging conditions of the plurality of imaging systems;
calculate a target resolution value which is a target value of recovery processing that recovers a plurality of captured images to be output from each of the plurality of the imaging systems based on each of the imaging conditions, the target resolution value minimizing a weighted error between the recovered images which is recovered with a weight according to the imaging condition being adapted for all of the plurality of imaging systems and ideal images before being deteriorated for all of the plurality of imaging systems in order to match resolution values of the recovered images of the plurality of imaging systems;
generate a recovery filter used for the recovery processing for each of the plurality of imaging systems based on each of the transfer functions of the plurality of imaging systems and the target resolution value; and
perform the recovery processing for the plurality of the captured images acquired from the plurality of imaging systems by using the recovery filter generated for each of the plurality of imaging systems to generate recovered images.

3. The image processing device according to claim 2, wherein the processor is further configured to input the weight representing a degree of matching with the target resolution value according to each of the imaging conditions input.

4. The image processing device according to claim 1, wherein the processor is further configured to calculate the target resolution value based on a criterion that minimizes a total value of square errors between the recovered images and the ideal images.

5. The image processing device according to claim 2, wherein the processor is further configured to calculate the target resolution value based on a criterion that minimizes a total value of square errors between the recovered images and the ideal images.

6. The image processing device according to claim 3, wherein the processor is further configured to calculate the target resolution value based on a criterion that minimizes a total value of square errors between the recovered images and the ideal images.

7. A camera system comprising:
the image processing device according to claim 1,
wherein the plurality of imaging systems and a control device that controls the plurality of imaging systems are connected wiredly or wirelessly, and
wherein the image processing device is provided in the control device.

8. A camera system comprising:
the image processing device according to claim 2,
wherein the plurality of imaging systems and a control device that controls the plurality of imaging systems are connected wiredly or wirelessly, and
wherein the image processing device is provided in the control device.

9. A camera system comprising:
the image processing device according to claim 3,
wherein the plurality of imaging systems and a control device that controls the plurality of imaging systems are connected wiredly or wirelessly, and
wherein the image processing device is provided in the control device.

10. A camera system comprising:
the image processing device according to claim 4,
wherein the plurality of imaging systems and a control device that controls the plurality of imaging systems are connected wiredly or wirelessly, and
wherein the image processing device is provided in the control device.

11. A camera system comprising:
the image processing device according to claim 1,
wherein the plurality of imaging systems and a control device that controls the plurality of imaging systems are connected wiredly or wirelessly, and
wherein the image processing device is provided in at least one of the plurality of imaging systems.

12. A camera system comprising:
the image processing device according to claim 2,
wherein the plurality of imaging systems and a control device that controls the plurality of imaging systems are connected wiredly or wirelessly, and
wherein the image processing device is provided in at least one of the plurality of imaging systems.

13. A camera system comprising:
a plurality of cameras having the image processing device according to claim 1,
wherein the plurality of imaging systems and a control device that controls the plurality of imaging systems are connected wiredly or wirelessly, and
wherein the image processing device is provided in each of the plurality of imaging systems.

14. A camera system comprising:
a plurality of cameras having the image processing device according to claim 2,
wherein the plurality of imaging systems and a control device that controls the plurality of imaging systems are connected wiredly or wirelessly, and
wherein the image processing device is provided in each of the plurality of imaging systems.

15. An image processing method, using the image processing device according to claim 1, comprising:
inputting each of transfer functions of a plurality of imaging systems;
calculating a target resolution value which is a target value of recovery processing that recovers a plurality of captured images to be output from each of the plurality of the imaging systems, the target resolution value minimizing an error between the recovered images for all of the plurality of imaging systems and ideal images before being deteriorated for all of the plurality of imaging systems in order to match resolution values of the recovered images of the plurality of imaging systems;
generating a recovery filter used for the recovery processing for each of the plurality of imaging systems based on each of the transfer functions of the plurality of imaging systems and the target resolution value; and
performing the recovery processing for the plurality of the captured images acquired from the plurality of imaging systems by using the recovery filter generated for each of the plurality of imaging systems to generate recovered images.

16. An image processing method, using the image processing device according to claim 2, comprising:
inputting each of transfer functions of a plurality of imaging systems;
inputting each of the imaging conditions of the plurality of imaging systems;
calculating a target resolution value which is a target value of recovery processing that recovers a plurality of captured images to be output from each of the plurality of the imaging systems based on each of the imaging conditions, the target resolution value minimizing an error between the recovered images which is recovered with a weight according to the imaging condition being adapted for all of the plurality of imaging systems and ideal images before being deteriorated for all of the plurality of imaging systems in order to match resolution values of the recovered images of the plurality of imaging systems;
generating a recovery filter used for the recovery processing for each of the plurality of imaging systems based on each of the transfer functions of the plurality of imaging systems and the target resolution value; and
performing the recovery processing for the plurality of the captured images acquired from the plurality of imaging systems by using the recovery filter generated for each of the plurality of imaging systems to generate recovered images.

17. A camera system in which a plurality of imaging systems are connected wiredly or wirelessly, the camera system comprising:
a processor configured to:
input each of transfer functions of the plurality of imaging systems;
calculate a target resolution value which is a target value of recovery processing that recovers a plurality of captured images to be output from each of the plurality of the imaging systems; and
generate a recovery filter used for the recovery processing for each of the plurality of imaging systems based on each of the transfer functions of the plurality of imaging systems and the target resolution value,
wherein the recovery filter minimizes an error between recovered images in the entire plurality of imaging systems and ideal images before being deteriorated in the plurality of imaging systems in order to match resolution values of the recovered images of the plurality of imaging systems.

18. A camera system in which a plurality of imaging systems are connected wiredly or wirelessly, the camera system comprising:
a processor configured to:
input each of transfer functions of a plurality of imaging systems; and
calculate a target resolution value which is a target value of recovery processing that recovers a plurality of captured images to be output from each of the plurality of the imaging systems,
wherein the target resolution value that minimizes an error between recovered images for all of the plurality of imaging systems and ideal images before being deteriorated for all of the plurality of imaging systems in order to match resolution values of the recovered images of the plurality of imaging systems.

19. A camera system in which a plurality of imaging systems are connected wiredly or wirelessly, the camera system comprising:
a processor configured to:
input each of transfer functions of a plurality of imaging systems;
input each of imaging conditions of the plurality of imaging systems;
calculate a target resolution value which is a target value of recovery processing that recovers a plurality of captured images to be output from each of the plurality of the imaging systems based on each of the imaging conditions; and generate a recovery filter used for the recovery processing with respect to for each of the plurality of imaging systems based on each of the transfer functions of the plurality of imaging systems and the target resolution value, wherein the recovery filter minimizes an error between recovered images which is recovered with a weight according to all of the imaging condition being adapted for all of the plurality of imaging systems and ideal images before being deteriorated for the plurality of imaging systems, with a precondition of minimizing a difference between resolution values of the recovered images of the plurality of imaging systems and the target resolution value.

20. A camera system in which a plurality of imaging systems are connected wiredly or wirelessly, the camera system comprising:

a processor configured to:

input each of transfer functions of a plurality of imaging systems;

input each of imaging conditions of the plurality of imaging systems; and calculate a target resolution value which is a target value of recovery processing that recovers a plurality of captured images to be output from each of the plurality of the imaging systems based on each of the imaging conditions, wherein the target resolution value minimizes an error between recovered images which is recovered with a weight according to all of the imaging condition being adapted for all of the entire plurality of imaging systems and ideal images before being deteriorated in the plurality of imaging systems, with a precondition of minimizing a difference between resolution values of the recovered images of the plurality of imaging systems and the target resolution value.

* * * * *